US011911879B1

(12) United States Patent
Gomez et al.

(10) Patent No.: US 11,911,879 B1
(45) Date of Patent: Feb. 27, 2024

(54) CHROME FLUSH VALVE INSTALLATION TOOL

(71) Applicants: Ector Cantu Gomez, Crowley, TX (US); Thomas Stephens, Euless, TX (US)

(72) Inventors: Ector Cantu Gomez, Crowley, TX (US); Thomas Stephens, Euless, TX (US)

(73) Assignee: Ector Cantu Gomez, Crowley, TX (US)

( * ) Notice: Subject to any disclaimer, the term of this patent is extended or adjusted under 35 U.S.C. 154(b) by 204 days.

(21) Appl. No.: 16/601,373

(22) Filed: Oct. 14, 2019

Related U.S. Application Data

(63) Continuation-in-part of application No. 15/696,659, filed on Sep. 6, 2017, now abandoned.

(60) Provisional application No. 62/745,923, filed on Oct. 15, 2018, provisional application No. 62/383,782, filed on Sep. 6, 2016.

(51) Int. Cl.
*B25B 13/50* (2006.01)
*B25B 7/10* (2006.01)

(52) U.S. Cl.
CPC ................ *B25B 13/50* (2013.01); *B25B 7/10* (2013.01)

(58) Field of Classification Search
CPC .................................... B25B 7/02; B25B 7/10
USPC ........................................................... 81/411
See application file for complete search history.

(56) References Cited

U.S. PATENT DOCUMENTS 3,161,094 A * 12/1964 Johnson .................... B25B 7/10 81/412
3,176,551 A * 4/1965 Hansen ..................... B25B 7/14 81/341
3,309,949 A * 3/1967 Neff ........................ B25B 13/46 81/111
3,939,739 A * 2/1976 Kotsakis ................. B25B 13/46 81/138
5,050,464 A * 9/1991 Hurtig ..................... B25B 13/46 81/97
5,894,768 A * 4/1999 Malkin ................... B25B 13/10 81/170
6,318,217 B1 * 11/2001 Emhardt ................... B25B 7/10 81/416
7,681,477 B2 * 3/2010 Alexander ................ B25B 7/10 81/413

* cited by examiner

*Primary Examiner* — Bryan R Muller

(57) ABSTRACT

A flush valve installation tool and associated method is used to install and uninstall chrome flush valves. The installation tool is capable of installing and uninstalling nuts of a variety of sizes without causing damage to the surfaces of the nuts. The flush valve installation tool has opposing first and second members coupled together by a pin or bolt. The first and second members each have two or more smooth jaw faces configured to engage 4 or 5 surfaces of a nut to be installed or uninstalled. The flush valve installation tool can be adjusted to select the distance between opposing jaw faces to accommodate different sized nuts.

19 Claims, 22 Drawing Sheets

CHROME FLUSH VALVE INSTALLATION TOOL

RELATED APPLICATIONS

This application is a Continuation-in-Part to of U.S. patent application Ser. No. 15/696,659, filed Sep. 6, 2017, which claims a benefit of priority under 35 U.S.C. §119 to U.S. Provisional Patent Application No. 62/383,782, filed Sep. 6, 2016, entitled "CHROME FLUSH VALVE INSTALLATION TOOL." This application also claims priority to commonly owned U.S. patent application No. 62/745,923, filed on Oct. 15, 2018, entitled "CHROME FLUSH VALVE INSTALLATION TOOL,". All of these applications are hereby fully incorporated by reference in their entireties, including any appendices attached thereto.

FIELD OF THE INVENTION

This invention relates to the field of plumbing. In particular, this invention is drawn to an installation tool for installing a chrome flush valve.

BACKGROUND OF THE INVENTION

FIG. 1 (described in detail below) is a front view of a typical chrome flush valve used as a flush valve for toilets, urinals, etc. When a flush valve is installed or uninstalled, various chrome nuts are tightened or loosened. During a typical flush valve installation, the installer must have various tools available to tighten the various sized nuts. If typical prior art pipe wrench or adjustable pliers are used (described and shown below), the chrome nuts may get scratched or damaged, due to teeth on the pliers, and due to the pliers not adequately grabbing the nuts. If the chrome finish on the nuts is damaged, and installer may be required to replace the damaged flush valve, costing the installer time and money. While multiple sized wrenches may be used, this requires an installer to carry multiple tools, and can slow the installation process as the installer constantly swaps tools.

It is therefore desirable to provide a single tool that can be used with various sized chrome nuts, without scratching or damaging the chrome finish on the nuts.

SUMMARY OF THE INVENTION

In one embodiment, a flush valve installation tool includes a first member, a first, second, and third jaw faces formed proximate one end of the first member, the first and second jaw faces forming a 120 degree angle, the second and third jaw faces forming a 120 degree angle such that the first, second, and third jaw faces form three sides of a hexagon, the first, second, and third jaw faces each having a smooth surface, a second member slidably and rotatably coupled to the first member, fourth and fifth jaw faces formed proximate one end of the second member, the fourth and fifth jaw faces forming a 120 degree angle, the fourth and fifth jaw faces each having a smooth surface, and wherein at least four of the jaw faces conform to the shape of a hexagonal-shaped nut when the first and second members are squeezed together by a user with the jaw faces engaging the hexagonal nut.

Another embodiment provides a flush valve installation tool including a first member, two or more jaw faces formed proximate one end of the first member, at least two or more of jaw faces of the first member forming a 120 degree angle, the two or more jaw faces of the first member having a smooth surface, a second member movably coupled to the first member, two or more jaw faces formed proximate one end of the second member, at least two or more of jaw faces of the second member forming a 120 degree angle, the two or more jaw faces of the second member having a smooth surface, and wherein the first and second members are movable with respect to one another to allow a user to adjust the size of the flush valve installation tool to accommodate different sized nuts.

Another embodiment provides a method of installing nuts on a chrome flush valve including: providing a tool, the tool having first and second members rotatably coupled to each other, the first and second members each having a handle portion and an end portion, forming first and second jaw faces in end portion of the first member, the first and second jaw faces forming a 120 degree angle, the first and second jaw faces each having a smooth surface, forming third and fourth jaw faces in the end portion of the second member, the third and fourth jaw faces forming a 120 degree angle, the third and fourth jaw faces each having a smooth surface, threading a nut on the flush valve, placing the first, second, third, and fourth jaw faces around the nut, squeezing the handles of the first and second members to tightly engage four surfaces of the nut with the first, second, third, and fourth jaw faces, and applying torque to the tool to tighten the nut.

Other features and advantages of the present disclosure will be apparent from the accompanying drawings and from the detailed description that follows below.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION OF THE PREFERRED EMBODIMENT

Figure 1:
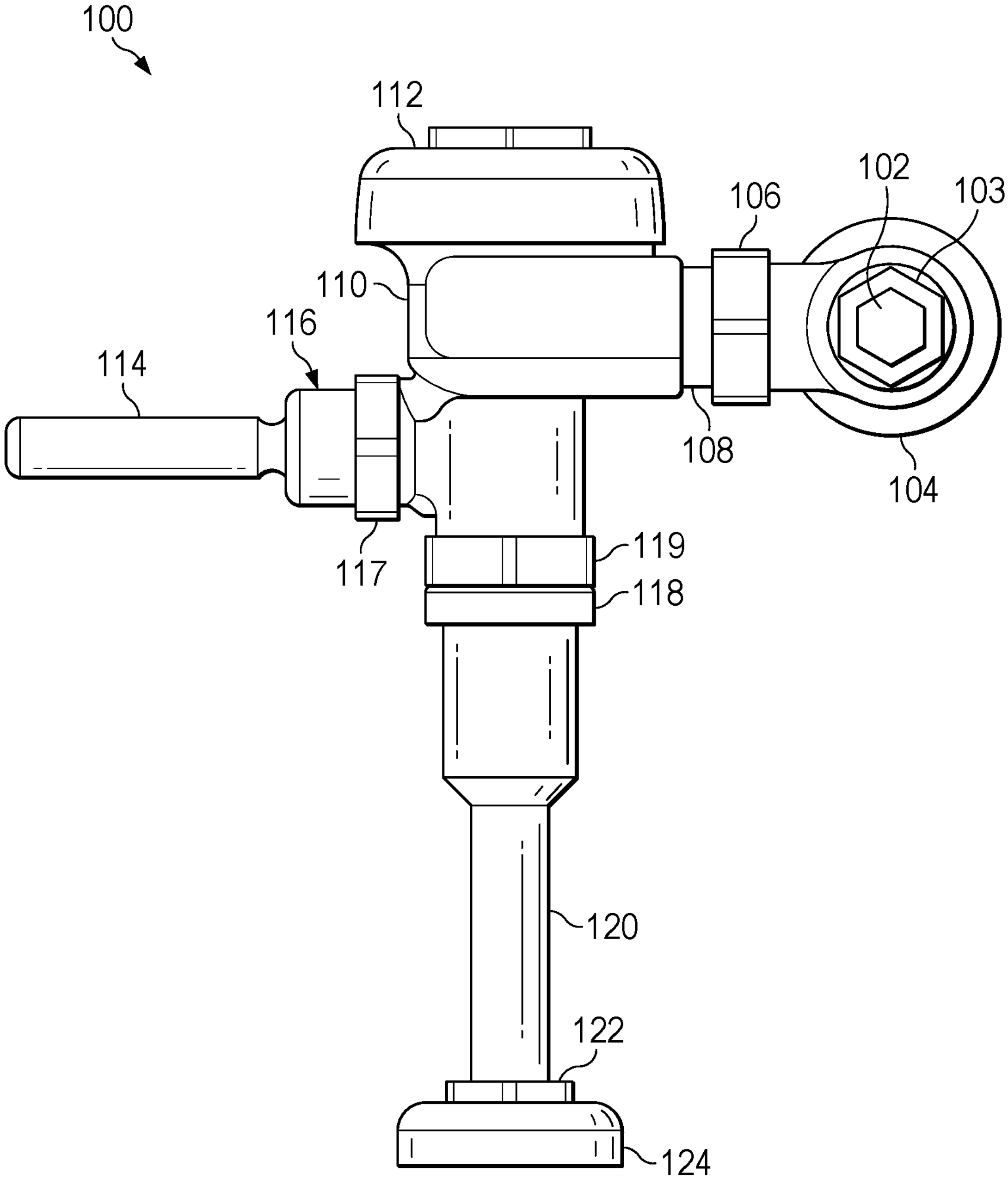
FIG. 1 (PRIOR ART)
FIG. 1 is a front view of a typical chrome flush valve.

FIG. 1 is a front view of a typical chrome flush valve 100 used as a flush valve for toilets, urinals, etc. At a water supply, the flush valve 100 has a control stop 102 and associated nut 103. A supply flange 104 fits against a wall (not shown) around the water supply line. A stop coupling nut 106 secures the control stop 102 to the remainder of the flush valve 100. A tailpiece 108 connects the supply line to a flush valve body 110. A cover 112 is positioned on top of the flush valve body 110.

A handle assembly 114 is coupled to a handle coupling 116 and associated nut 117. Downstream from the handle assembly 114 is an outlet coupling 118 and associated nut 119. Downstream from the outlet coupling 118 is flush connection 120 (vacuum breaker). A spud coupling 122 connects the flush valve 100 to a toilet/urinal/etc. (not shown). A spud flange 124 fits around the spud flange 124 and rests on the inlet portion of the toilet.

When a flush valve (such as flush valve 100 shown in FIG. 1) is installed or uninstalled, various chrome nuts (for example, nuts 103, 106, 117, 119, 122, etc.) have to be tightened or loosened. During a typical flush valve installation, the installer must have various tools available to tighten the various sized nuts. If typical prior art pipe wrench or adjustable pliers are used (described and shown below), the chrome nuts may get scratched or damaged, due to teeth on the pliers, and due to the pliers not adequately grabbing the nuts. If the chrome finish on the nuts is damaged, and installer may be required to replace the damaged flush valve, costing the installer time and money. While multiple sized wrenches may be used, this requires an installer to carry multiple tools, and can slow the installation process as the installer constantly swaps tools. It is therefore desirable to provide a single tool that can be used with various sized chrome nuts, without scratching or damaging the chrome finish on the nuts.

Figure 1A:
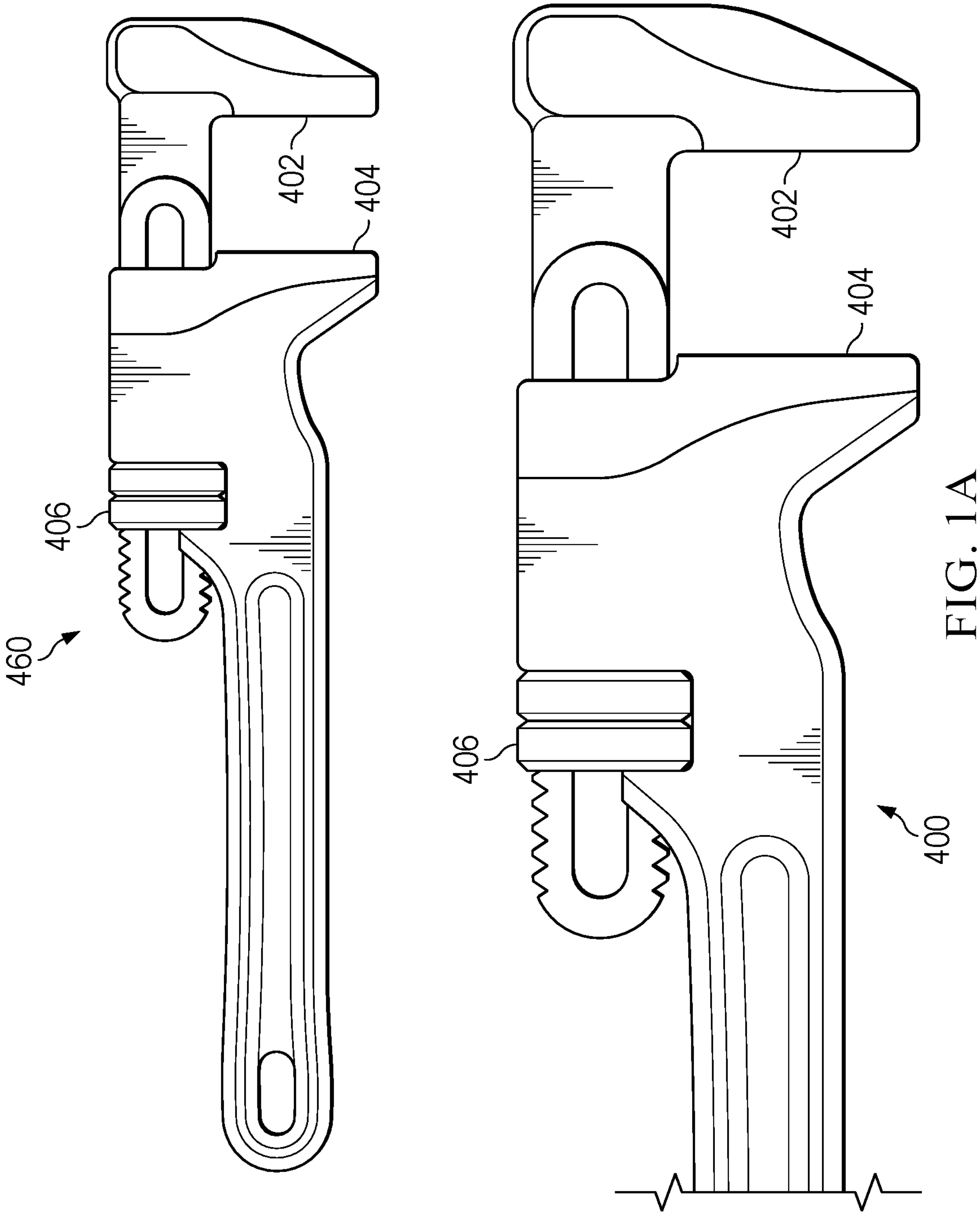
FIG. 1A (PRIOR ART)
FIG. 1A shows two views of a conventional prior art pipe wrench.

FIG. 1A shows two views of a conventional prior art pipe wrench 400 that is typically used by installers to install chrome flush valves. The pipe wrench 400 has two parallel jaws 402 and 402 that can be adjusted by adjustment screw 406 to fit different sized nuts. When an installer uses the pipe wrench 400, only two jaws are able to grasp a nut, increasing the chance of slippage and damage to the chrome finish of the nut. In addition, the jaws 402 and 404 have teeth, further increasing the chance of damage to the chrome finish of the nut. Besides damaging the chrome finish on nuts, a tool such as pipe wrench 400 has several other disadvantages. For example, a typical pipe wrench is very heavy and cumbersome. Also, when tightening a nut, several turns of the nut are usually needed. After turning the nut a half of a turn or so, the wrench 400 must be removed and repositioned to make further turns. Typically, the wrench 400 gets bound, and is difficult to remove from the nut without loosening the adjustment screw 406. Then, when repositioning the wrench 400, the adjustment screw 406 has to be adjusted again. This significantly increases the installation time of a flush valve.

Figure 2:
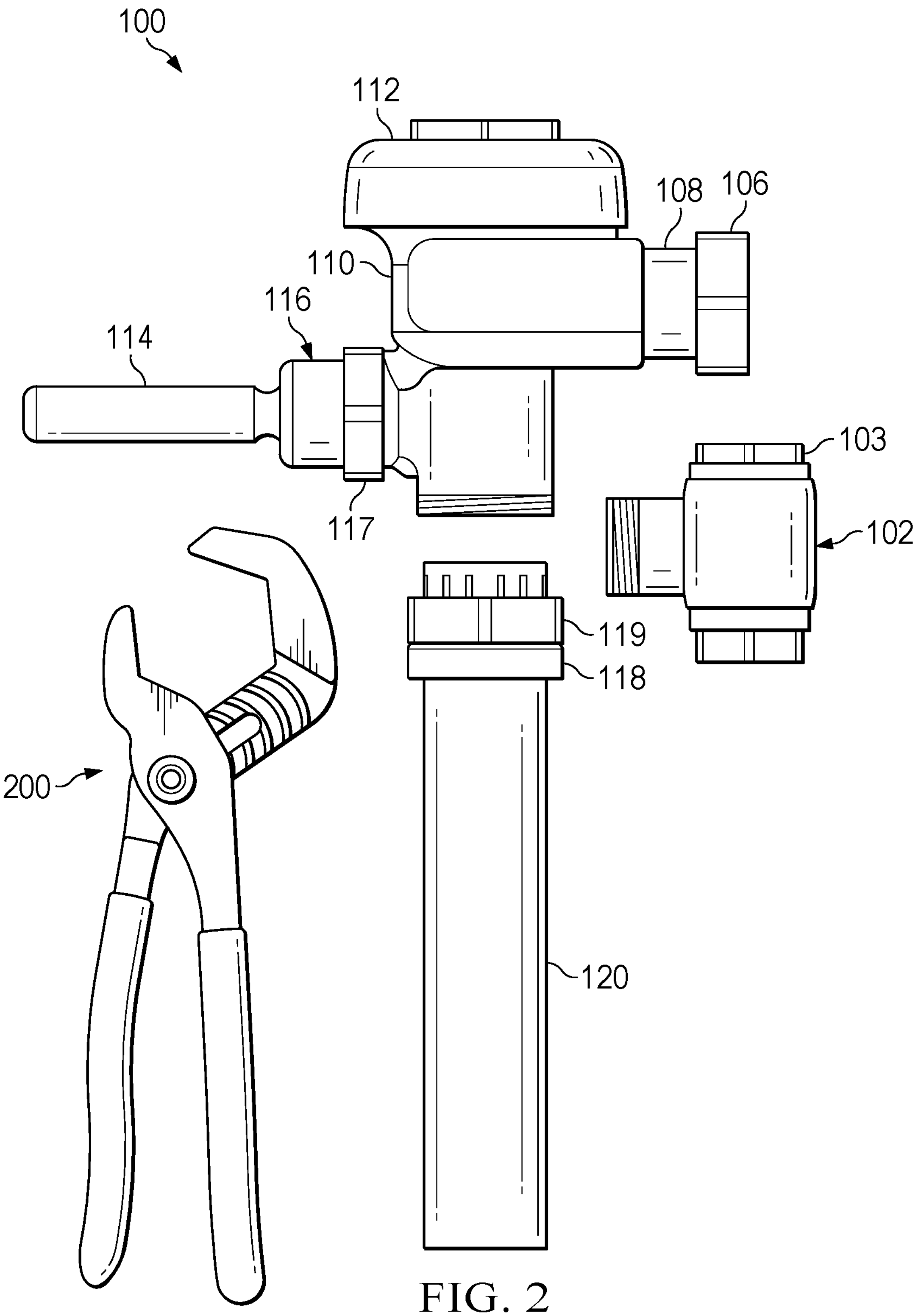
FIG. 2 is a view of a chrome flush valve installation tool of the present invention and a partially disassembled flush valve.

FIG. 2 is a view of a chrome flush valve installation tool 200 (described in detail below) and a partially disassembled flush valve 100, like the flush valve 100 shown in FIG. 1.

Figure 3:
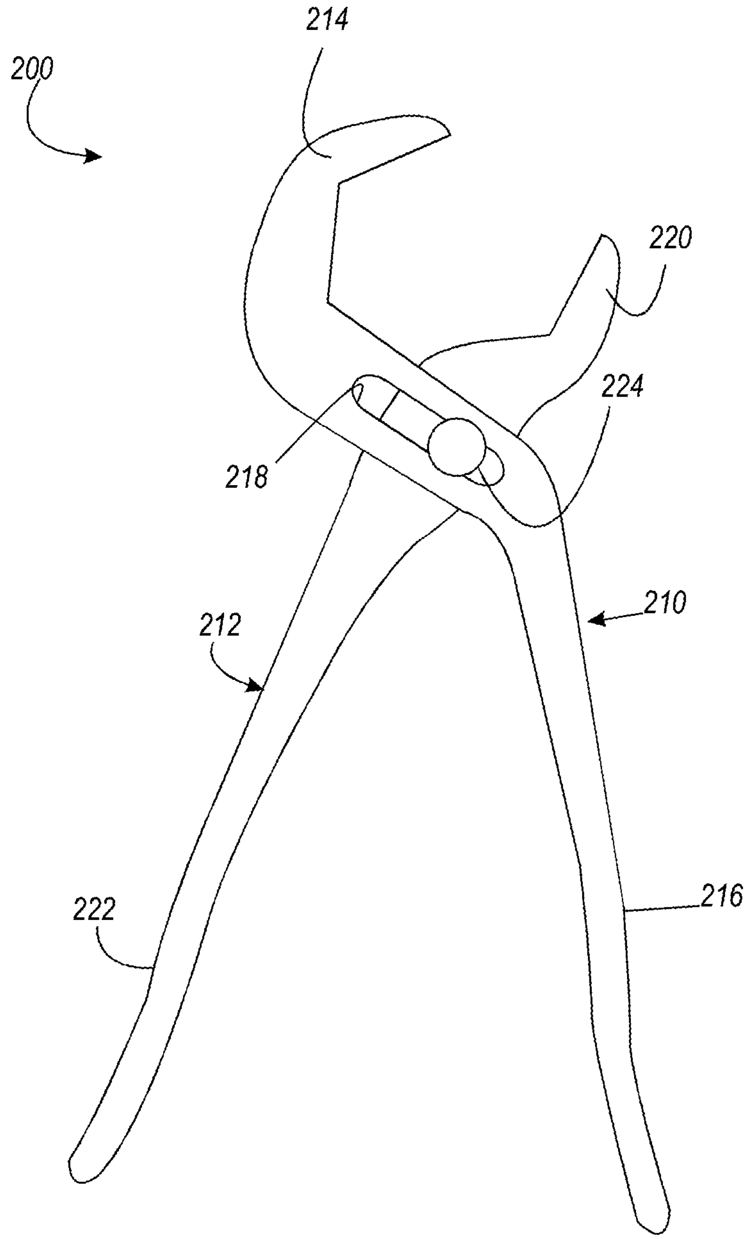
FIGS. 3-4 are side views of the flush valve installation tool shown in FIG. 2.
Figure 4:
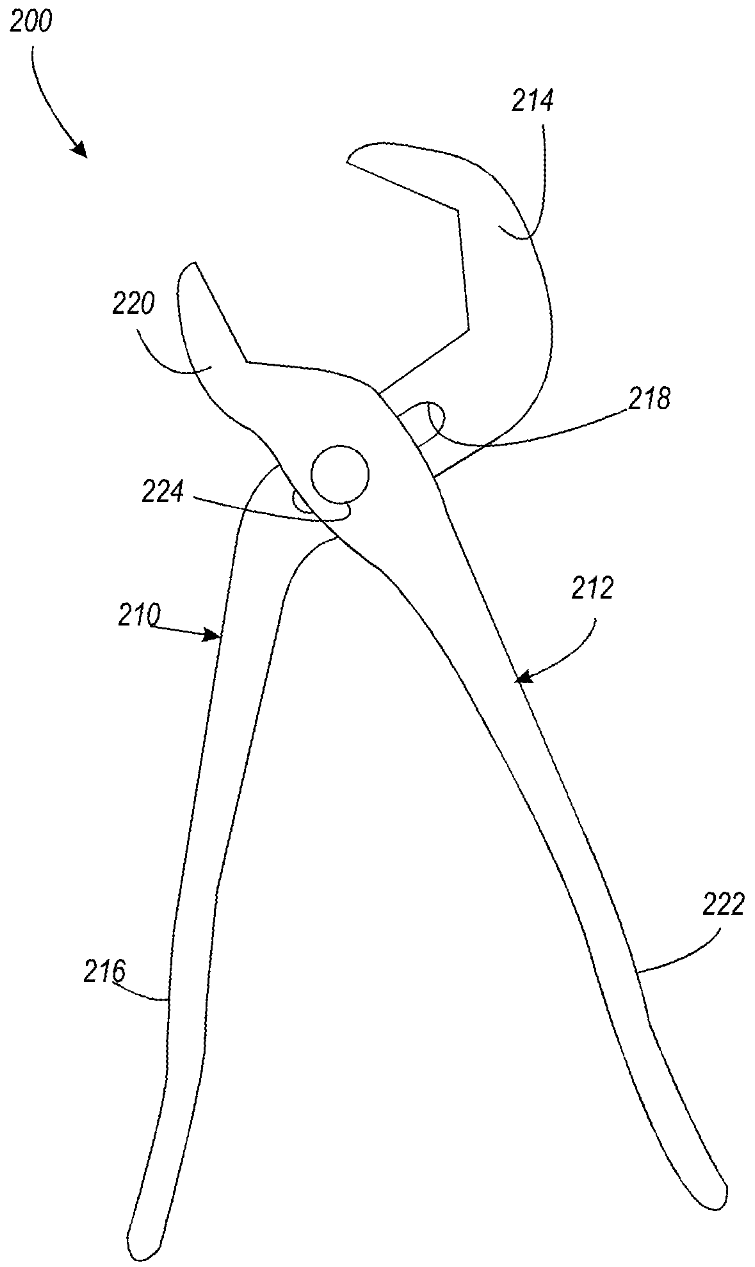
Figure 5:
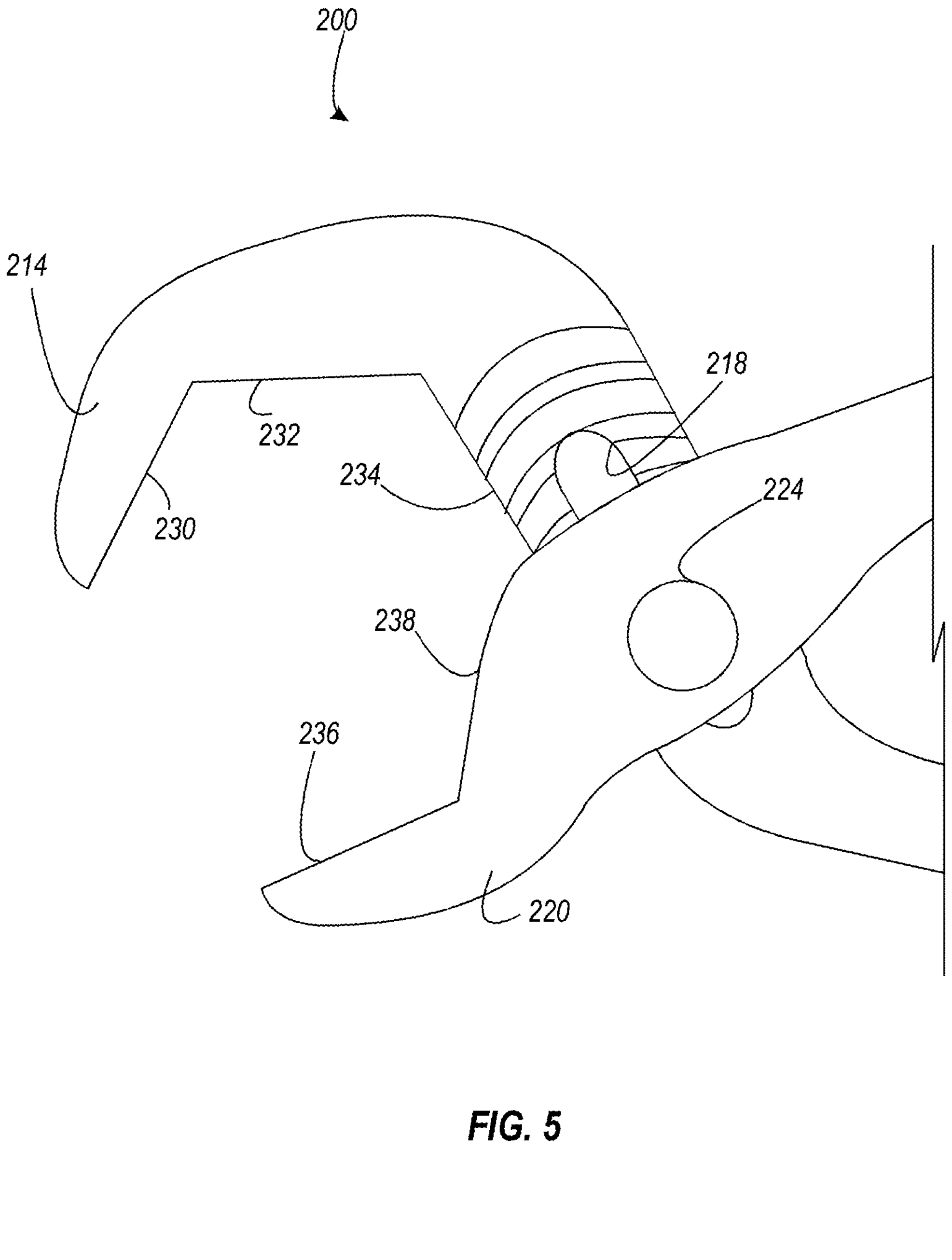
FIG. 5 is an enlarged partial view of the flush valve installation tool shown in FIG. 4.

FIG. 3 is a side view of the flush valve installation tool 200 shown in FIG. 2. FIG. 4 is a side view of the flush valve installation tool 200 shown in FIG. 3 from the opposite side. FIG. 5 is an enlarged partial view of the flush valve installation tool 200 shown in FIG. 4, showing more details of the jaws of the flush valve installation tool 200.

The flush valve installation tool 200 has opposing first and second members 210 and 212 coupled together by a pin/bolt 224. The first member 210 has a first handle 216 and a jaw 214 formed at the opposite end. The second member 212 has a first handle 222 and a jaw 220 formed at the opposite end. A slot 218 is formed in the first member 210 and is configured to slide with respect to second member 212 to adjust the distance between opposing jaw faces to accommodate different sized nuts. A series of protrusions are formed in the first member 210 (FIGS. 5-12) and are configured to engage corresponding grooves formed in the second member 212 to lock the tool 200 in a desired position, depending the size of the nut being tightened or loosened.

Figure 6:
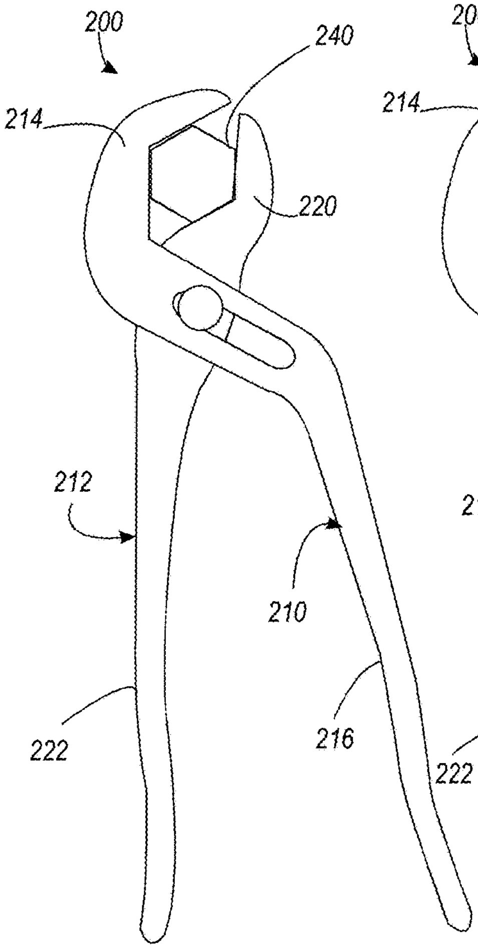
FIGS. 6-8 show side views of the flush valve installation tool being used with various sized nuts.
Figure 7:
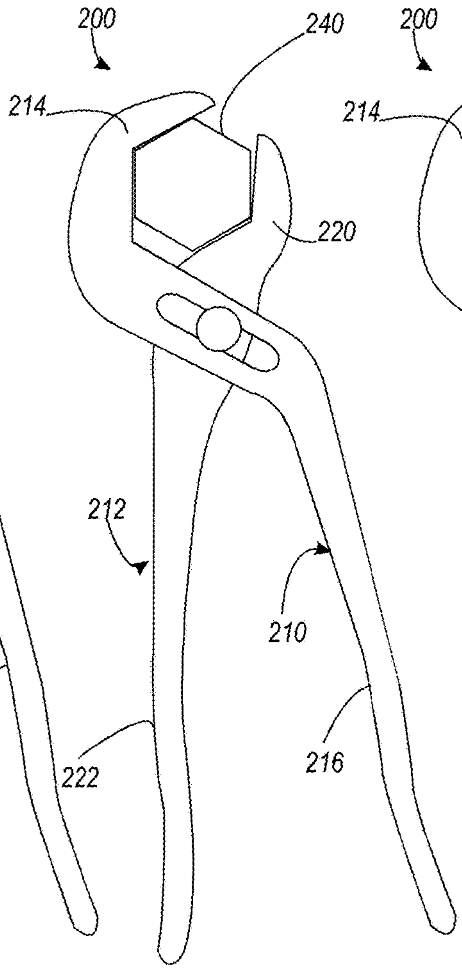
Figure 8:
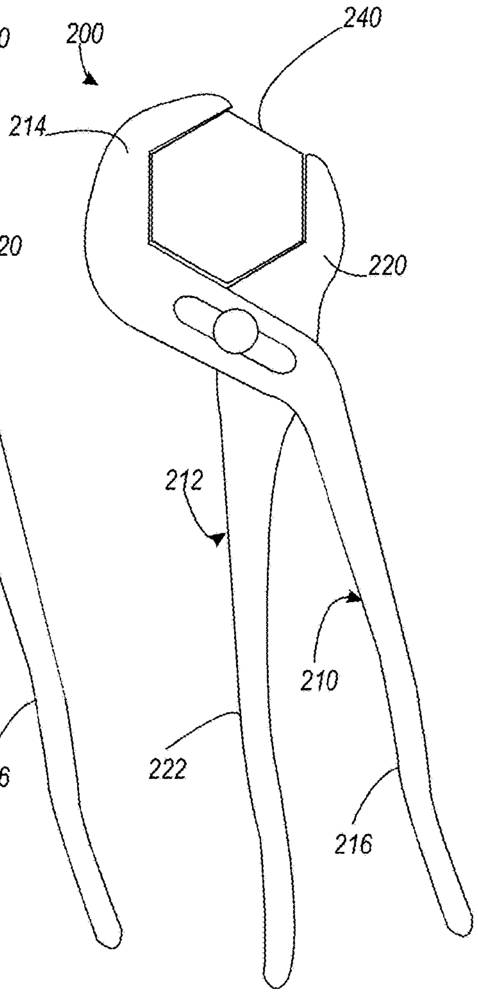

The enlarged view of the flush valve installation tool 200 shown in FIG. 5 shows the jaws 214 and 220 in more detail. As shown, the jaw 214 includes three jaw faces 230, 232, and 234. The jaw 220 includes two three jaw faces 236 and 238. Together, the jaws 214 and 220 form five jaw faces oriented at 120 degrees from one another, and form five sides of a hexagon of a desired size (selected by an installer by choosing the appropriate protrusion and groove). The surface of each jaw face is smooth (no teeth) so as not to scratch or damage chrome nuts. In some examples, the jaw faces may be coated with a soft material, such as rubber, plastic, etc., to further protect the chrome nuts. The dimensions of the jaw faces 230, 232, 234, 236, and 238 may be any size desired, but in one example, have the following lengths:

jaw face 230: 1⅛ inch
jaw face 232: 1⅛ inch
jaw face 234: 1¼ inch
jaw face 236: ¾ inch
jaw face 238: 1 inch FIGS. 6-8 show side views of the flush valve installation tool 200 being used with various sized nuts (for example, nuts 103, 106, 117, 119, 122, shown in FIG. 1). FIG. 6 shows the flush valve installation tool 200 being used with a relatively small nut 240. FIG. 7 shows the flush valve installation tool 200 being used with a medium sized nut 240. FIG. 8 shows the flush valve installation tool 200 being used with a relatively large nut 240. As shown, with the relatively small and medium sized nuts, four of the jaw faces engage four of six sides of the nut 240. With the relatively large nut (FIG. 8), five of the jaw faces engage five of six sides of the nut 240. In either example, the nut 240 can be securely engaged, ensuring that the nut 240 can tightened and loosened without damaging or scratching the nut.

Figure 6A:
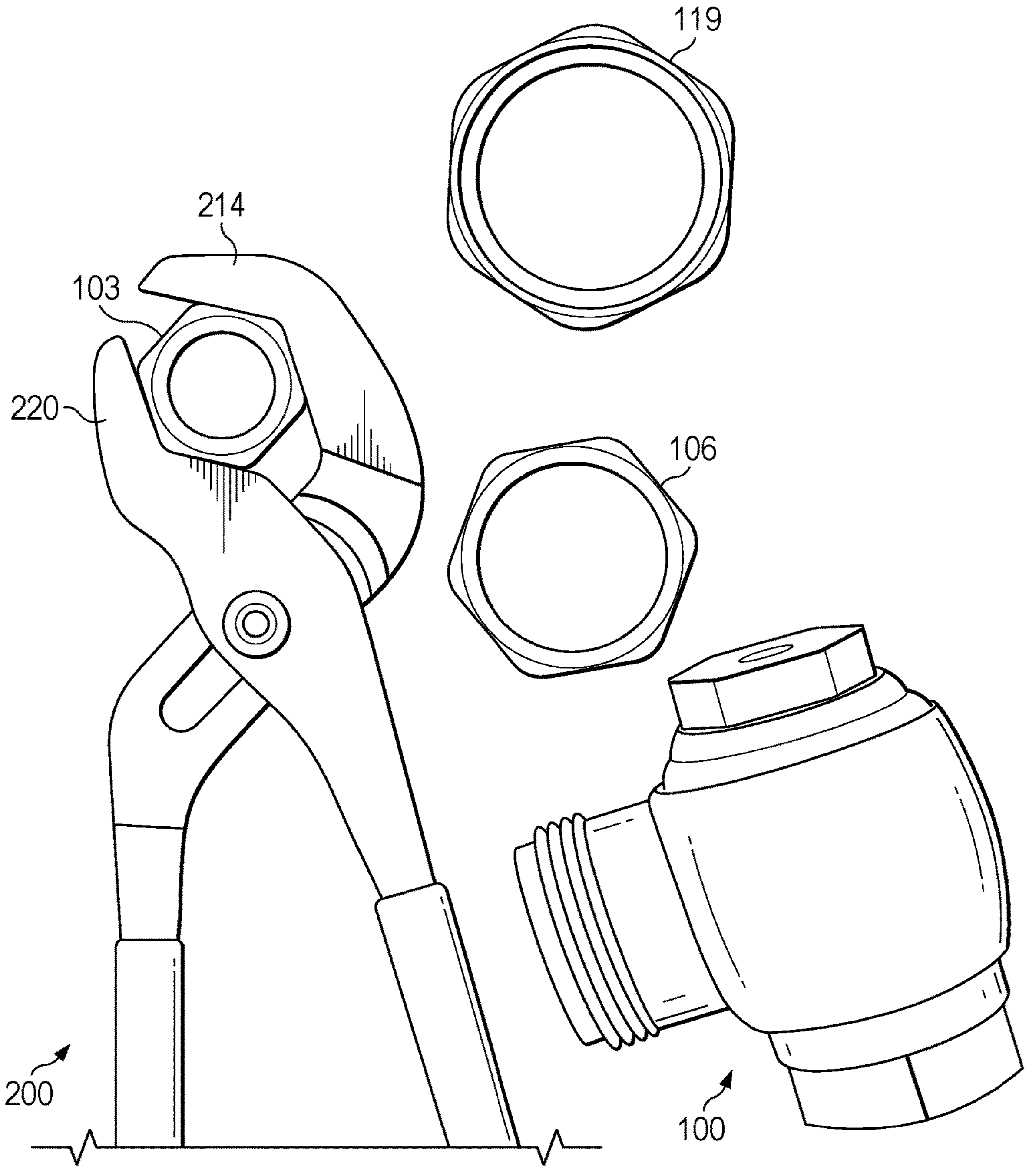
FIG. 6A shows another example of the flush valve installation tool being used with a relatively small nut.
Figure 7A:
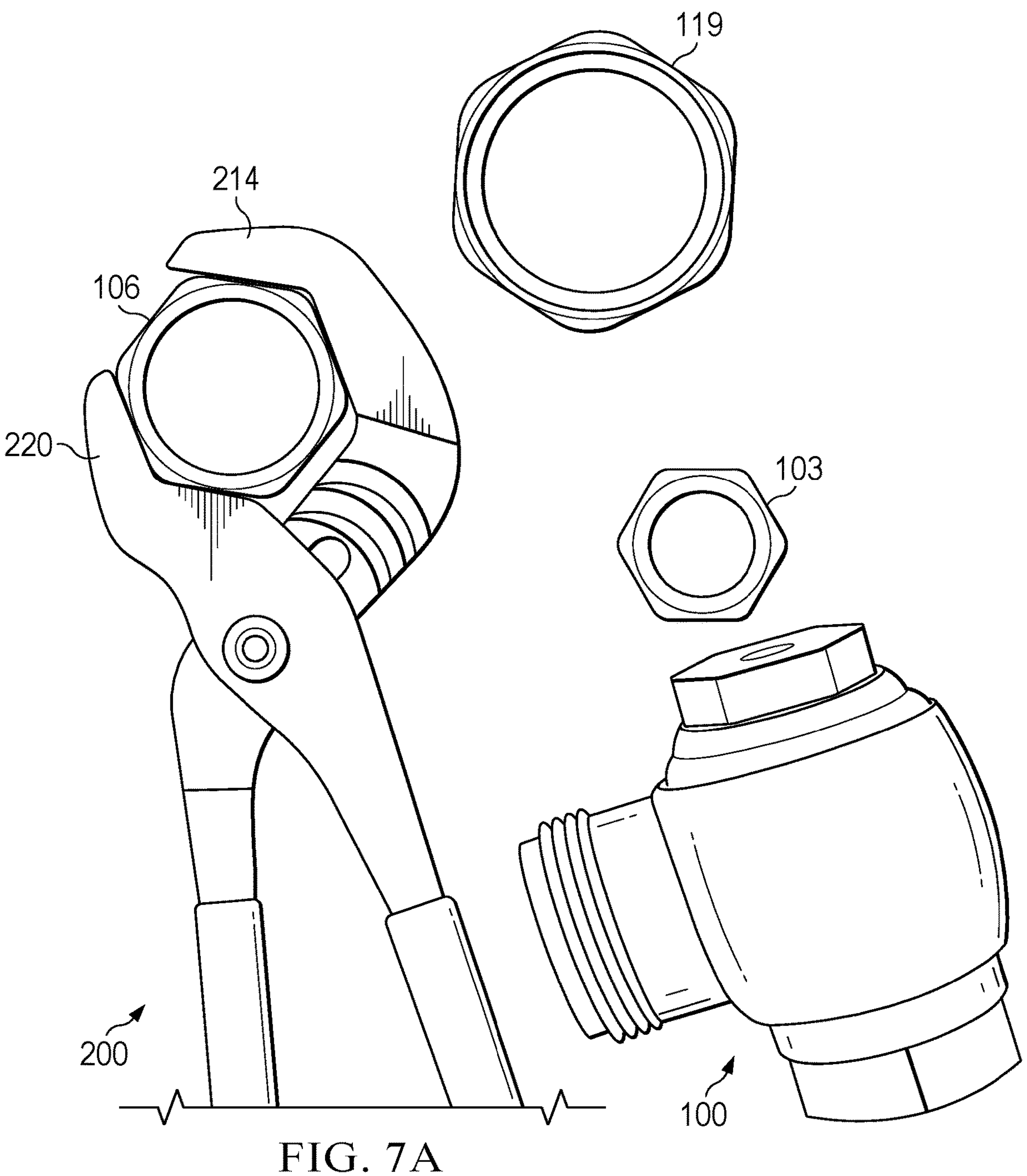
FIG. 7A shows another example of the flush valve installation tool being used with a medium sized nut.
Figure 8A:
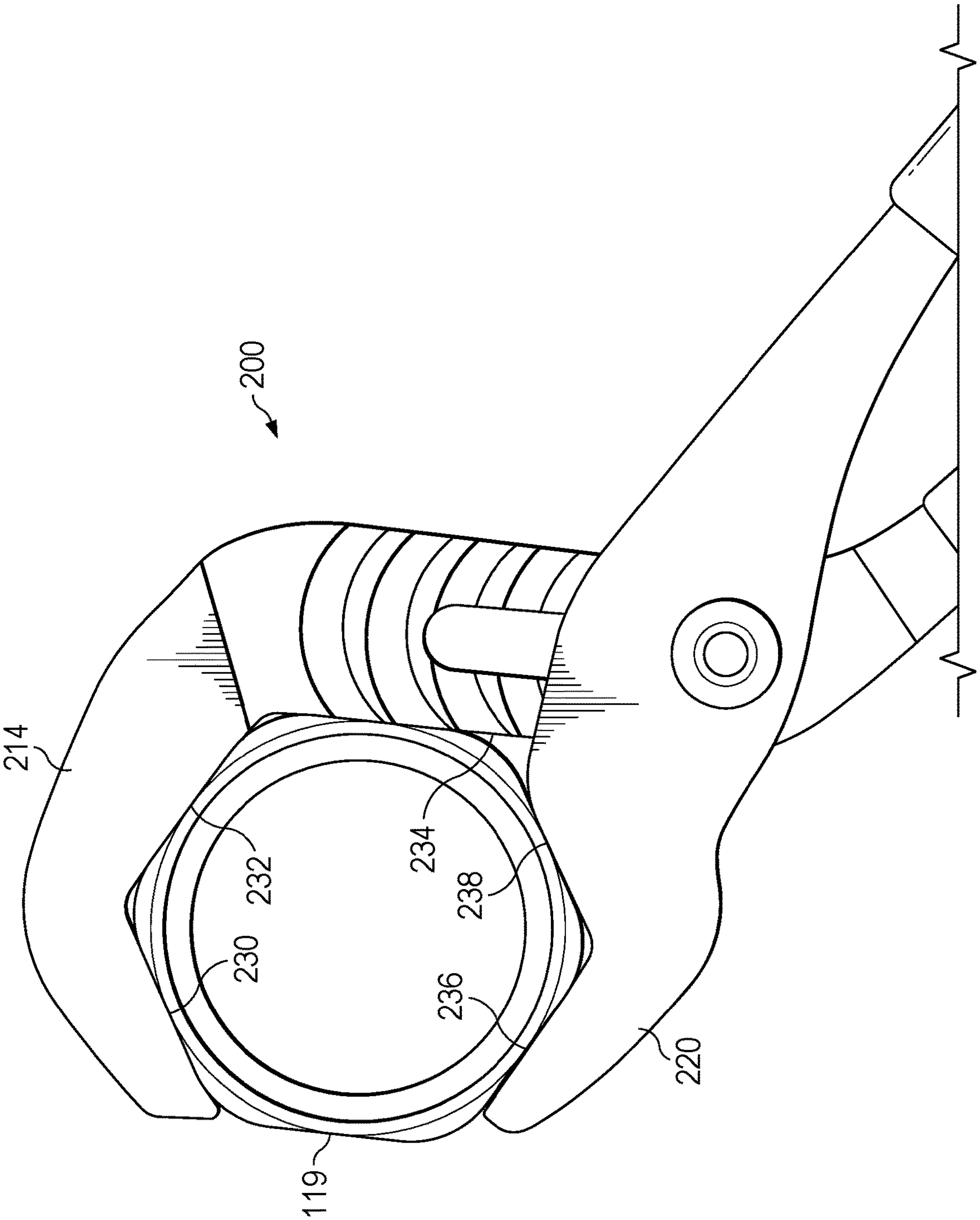
FIG. 8A shows another example of the flush valve installation tool being used with a relatively large nut.

FIG. 6A shows another example of the flush valve installation tool 200 being used with a relatively small nut, in this example, control stop nut 103, shown in FIG. 1. FIG. 7A shows another example of the flush valve installation tool 200 being used with a medium sized nut, in this example, stop coupling nut 106, shown in FIG. 1. FIG. 8A shows another example of the flush valve installation tool 200 being used with a relatively large nut, in this example, outlet coupling nut 119, shown in FIG. 1.

Figure 9B:
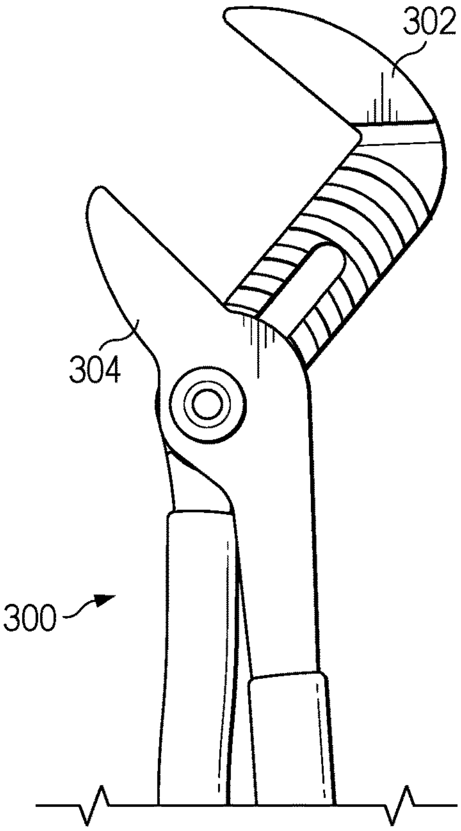
FIG. 9B (PRIOR ART)
FIGS. 9A and 9B are side views illustrating the distinctions between a flush valve installation tool and typical prior art adjustable pliers.
Figure 9A:
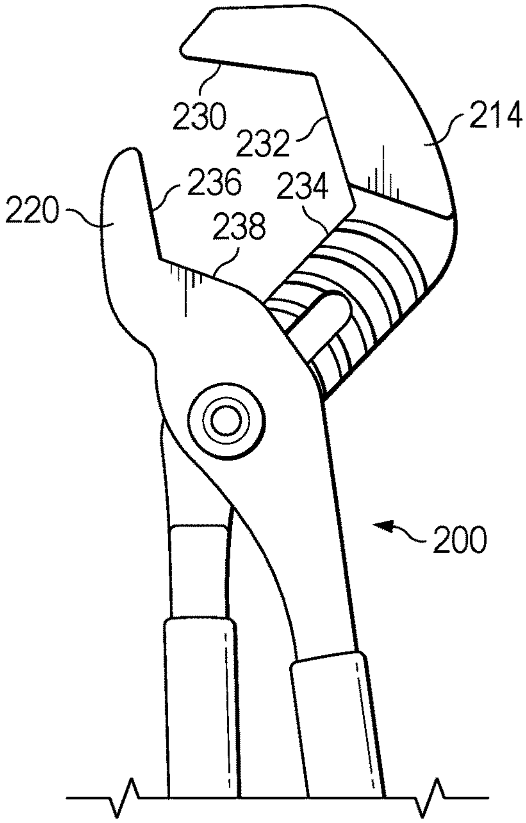
Figure 10:
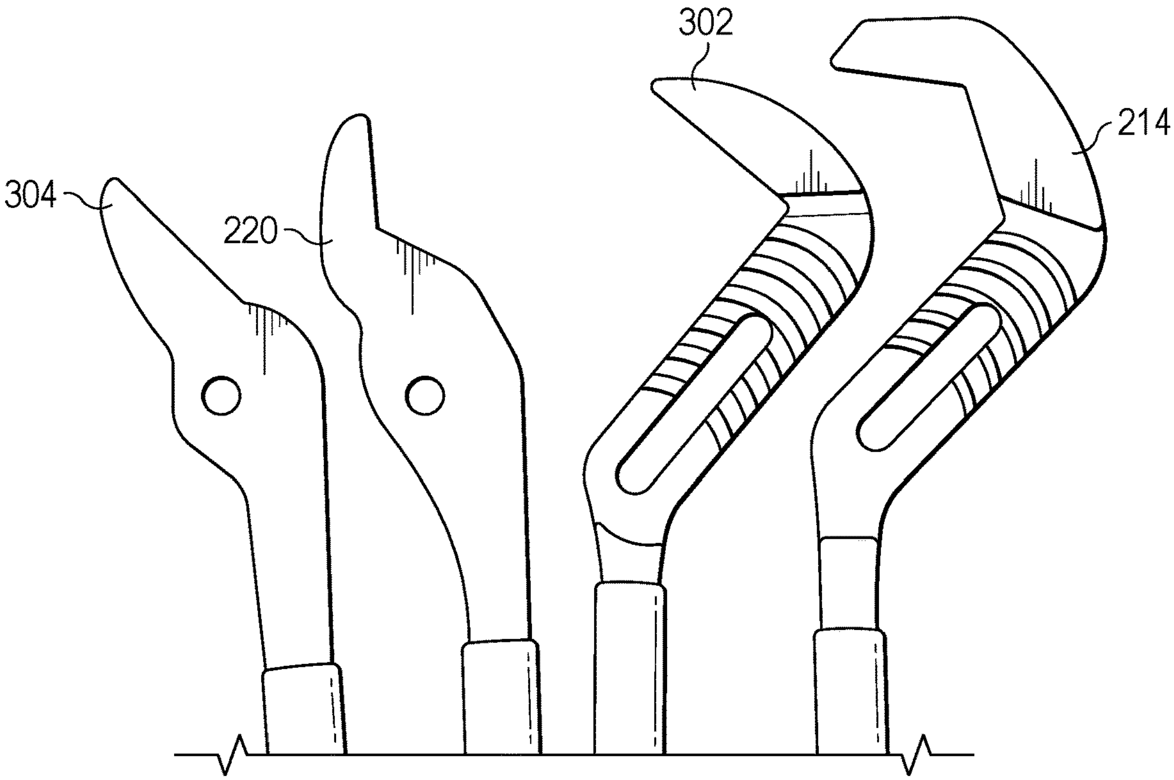
FIG. 10 is a view of the flush valve installation tool and the adjustable pliers disassembled, to more clearly illustrate the distinctions between them.

FIGS. 9A and 9B are side views illustrating the distinctions between a flush valve installation tool 200 and typical prior art adjustable pliers 300. FIG. 9A is a side view of the flush valve installation tool 200 described above. FIG. 9B is a side view of typical prior art adjustable pliers 300. As shown in FIG. 9B, the pliers 300 have opposing jaws 302 and 304, each having a jaw face with teeth. FIG. 10 is a view of the flush valve installation tool 200 and the adjustable pliers 300 disassembled, to more clearly illustrate the distinctions between them. The right portion of FIG. 10 shows jaw 214 of flush valve installation tool 200 and jaw 302 of adjustable pliers 300. As shown, the jaw 214 has three jaw faces 230, 232, and 234 (FIG. 9A), oriented at a 120 degree angles from one another. The jaw 302 has a single jaw face. As shown in the left portion of FIG. 10, the jaw 220 has two jaw faces 236 and 238 (FIG. 9A), oriented at a 120 degree angles from one another. The jaw 304 has a single jaw face.

Figure 11:
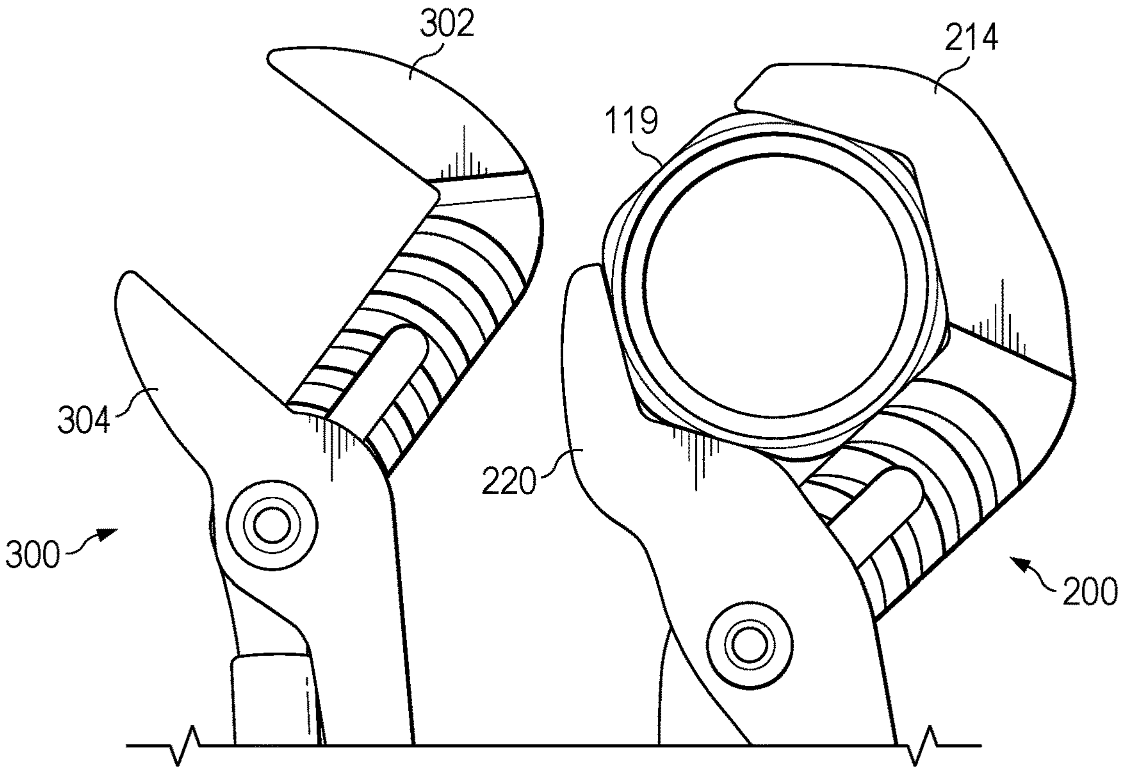
FIGS. 11-12 show the flush valve installation tool and adjustable pliers being used with an outlet coupling nut to help illustrate the distinctions between the flush valve installation tool and adjustable pliers.
Figure 12:
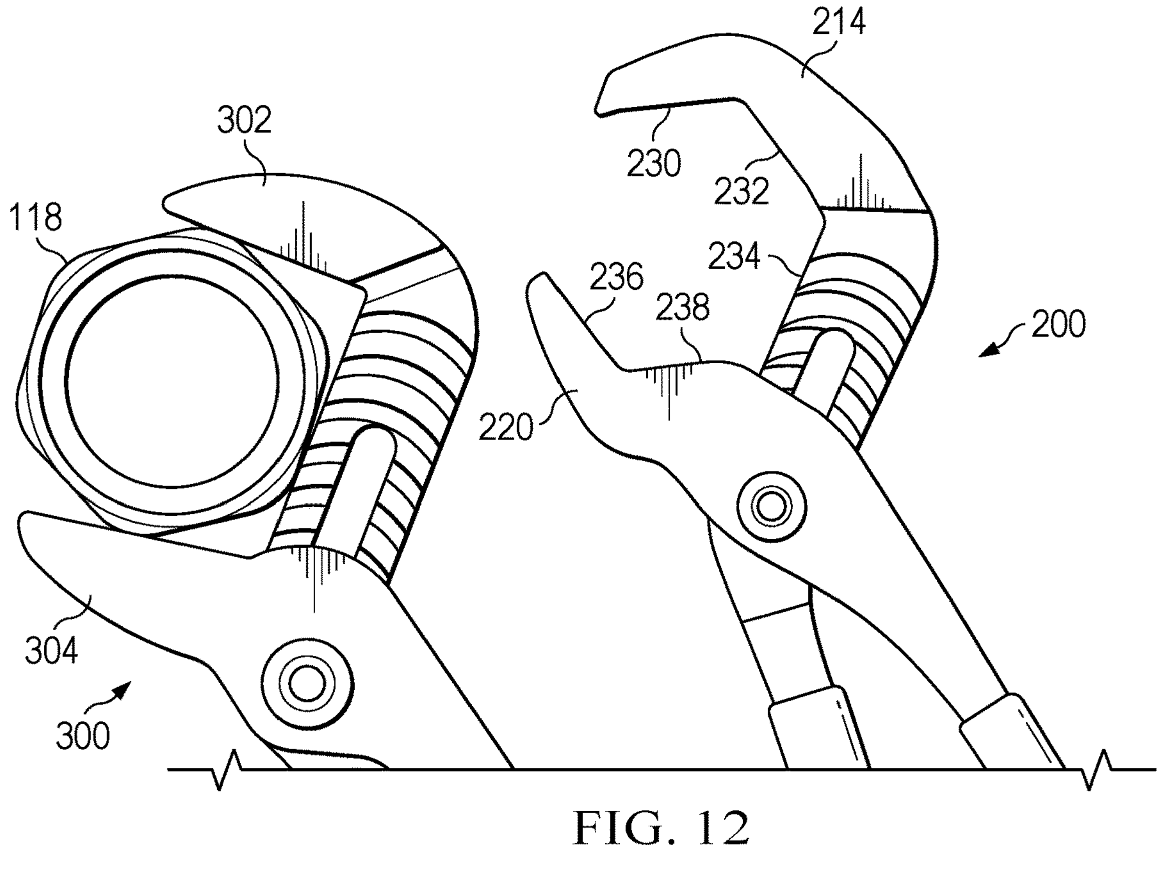

FIGS. 11-12 show the flush valve installation tool 200 and adjustable pliers 300 being used with the outlet coupling nut 119 to help illustrate the distinctions between the flush valve installation tool 200 and adjustable pliers 300. As shown in FIG. 11, the flush valve installation tool 200 engages the outlet coupling nut 119 on five of six sides, with smooth jaw faces. By gripping the nut 119 on five sides, the flush valve installation tool 200 is less likely to slip, which can be the cause of scratching a chrome nut. In contrast, as shown in FIG. 12, the adjustable pliers 300 engage, at most, two sides of the outlet coupling nut 119, greatly increasing the chance of scratching or damaging the chrome surfaces of the nut 119. In addition the teeth of the faces of jaws 302 and 304 also increase the chance of scratching or damaging the chrome surfaces of the nut 119.

Figure 13:
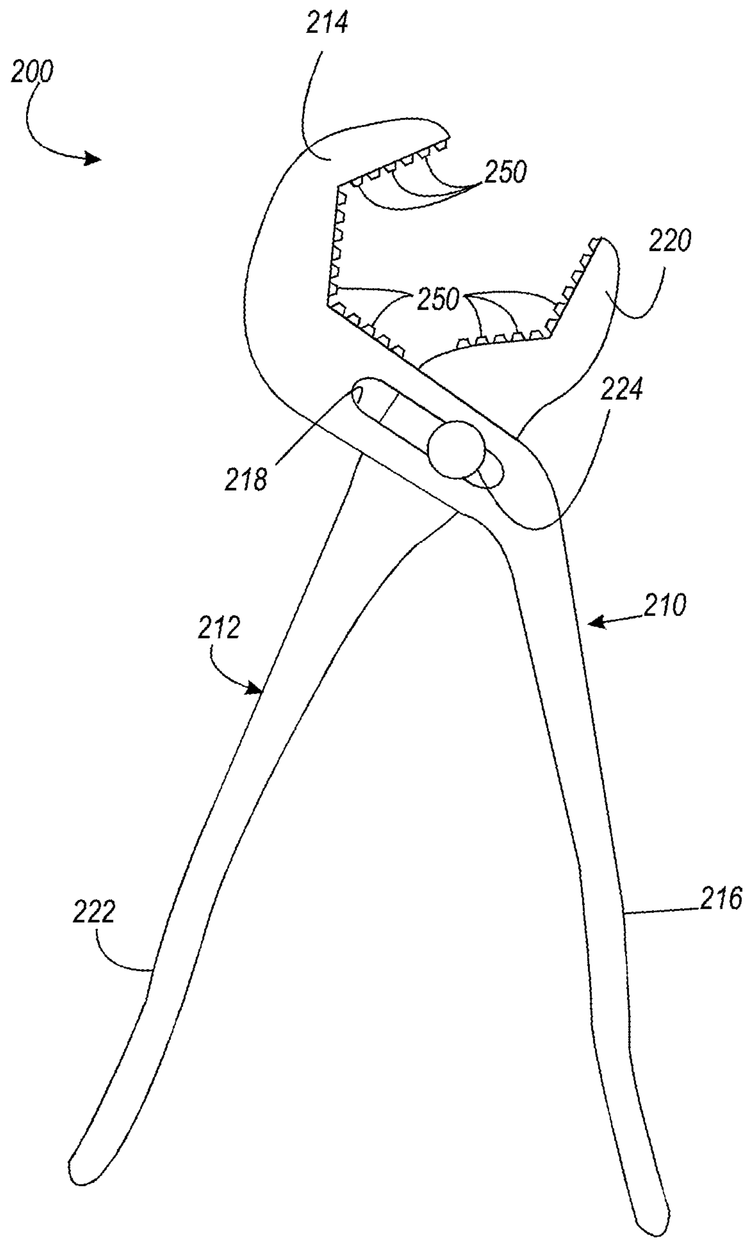
FIG. 13 is a side view of an alternative flush valve installation tool.

While the examples above show flush valve installation tools with smooth jaw faces, other examples are possible. For example, one or more of the jaw faces may include teeth or other types of surfaces for reducing slippage when damage to chrome parts is less of a concern. FIG. 13 is a side view of a flush valve installation tool 200 similar to the tools described above. In this example, each jaw face has a plurality of teeth 250 for reducing slippage. The shape, position, dimensions, and configuration, etc., of the teeth can vary, as desired.

Following is one example of a use of the flush valve installation tool 200 described above. For this example, assume that a user is installing a flush valve, such as flush valve 100. For the purposes of this example, only a few of the installation steps will be described to provide several examples of the use of the flush valve installation tool. Also note the steps described are not necessarily performed in the order described.

Assume during the installation of the flush valve 100 (FIGS. 1, 2), the user will need to install and tighten several nuts, including control stop nut 103, stop coupling nut 106, and outlet coupling nut 119. As shown best in FIG. 6A, control stop nut 103 can be considered to be a "small" nut, stop coupling nut 106 can be considered to be a "medium" sized nut, and outlet coupling nut 119 can be considered to be a "large" nut.

When the user is ready to install the "small" control stop nut 103, the first and second members 210 and 212 are slidably adjusted by aligning the appropriate protrusions and grooves such that opposing jaw surfaces 230/232 and 236/238 conform to the size of control stop nut 103 (FIG. 6A). In this configuration, the jaw faces 230, 232, 236, 238 form four sides of a hexagonal shape, defined by the shape of control stop nut 103. As a result, four jaw faces (faces 230, 232, 236, 238) closely engage the outer edges of the control stop nut 103 when the user squeezes the first and second handles 216, 222 (FIG. 6A). When the user then applies torque to the nut 104 via the flush valve installation tool 200, the nut tightens. Since the jaw faces are smooth, and four jaw faces conform to four sides of the nut, the nut 103 is tightened without causing damage to the chrome finish of the nut 103.

When the user is ready to install the "medium" stop coupling nut 106, the first and second members 210 and 212 are slidably adjusted by aligning the appropriate protrusions and grooves such that opposing jaw surfaces 230/232 and 236/238 conform to the size of stop coupling nut 106 (FIG. 7A). In this configuration, the jaw faces 230, 232, 236, 238 form four sides of a hexagonal shape, defined by the shape of stop coupling nut 106. As a result, four jaw faces (faces 230, 232, 236, 238) closely engage the outer edges of the stop coupling nut 106 when the user squeezes the first and second handles 216, 222 (FIG. 6A). When the user then applies torque to the nut 106 via the flush valve installation tool 200, the nut tightens. Since the jaw faces are smooth, and four jaw faces conform to four sides of the nut 106, the nut is tightened without causing damage to the chrome finish of the nut 106.

When the user is ready to install the "large" outlet coupling nut 119, the first and second members 210 and 212 are slidably adjusted by aligning the appropriate protrusions and grooves such that opposing jaw surfaces 230/232/234 and 236/238 conform to the size of outlet coupling nut 119 (FIG. 8A). In this configuration, the jaw faces 230, 232, 234, 236, 236 form five sides of a hexagonal shape, defined by the shape of outlet coupling nut 119. As a result, four jaw faces (faces 230, 232, 234, 236, 238) closely engage the outer edges of the control stop nut 103 when the user squeezes the first and second handles 216, 222 (FIG. 6A). When the user then applies torque to the nut 119 via the flush valve installation tool 200, the nut tightens. Since the jaw faces are smooth, and four jaw faces conform to four sides of the nut, the nut 119 is tightened without causing damage to the chrome finish of the nut 119.

FIGS. 14-25 relate to a flush valve installation tool 300 that is similar to the flush valve installation tool 200 described above, but with an alternative mechanism to lock the tool in a desired position for different sized nuts.

Figure 14:
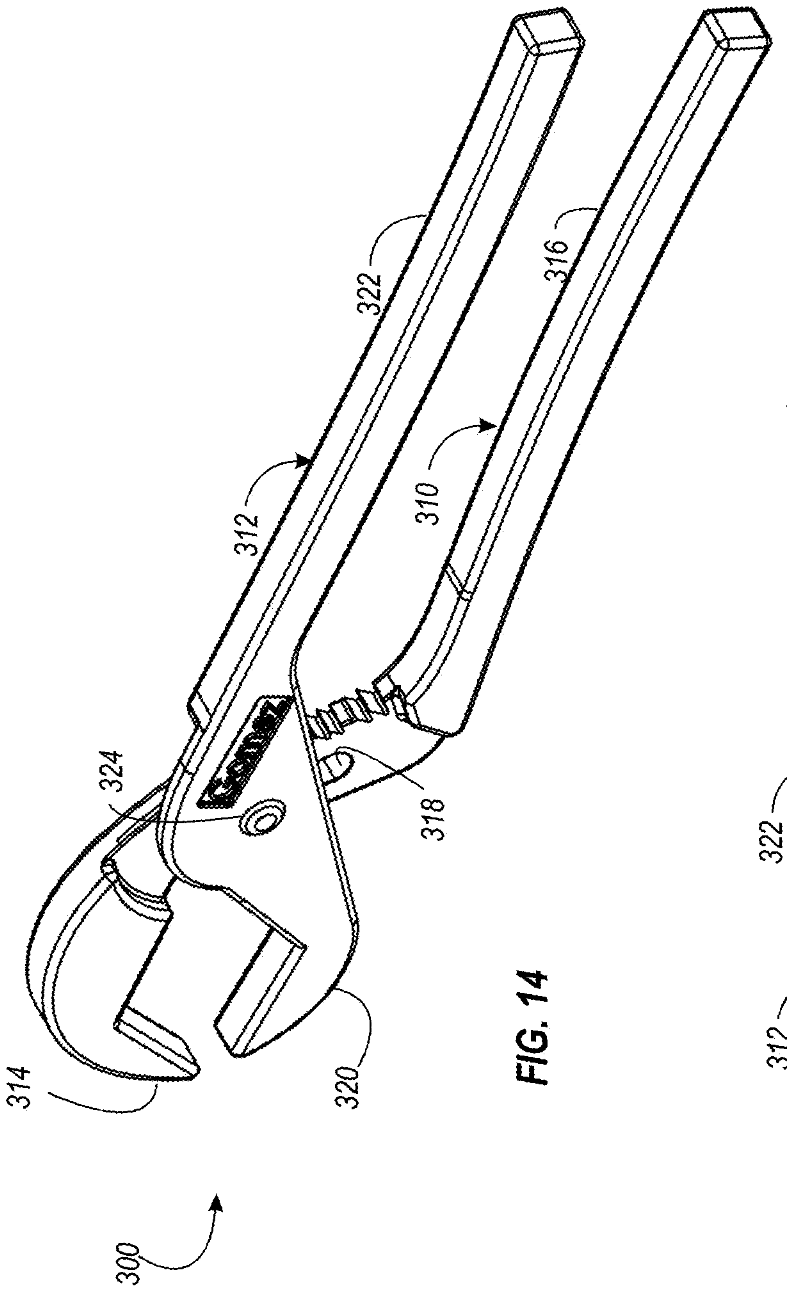
FIG. 14 is an isometric view of a flush valve installation tool with an alternative way of locking the tool in a desired position.
Figure 15:
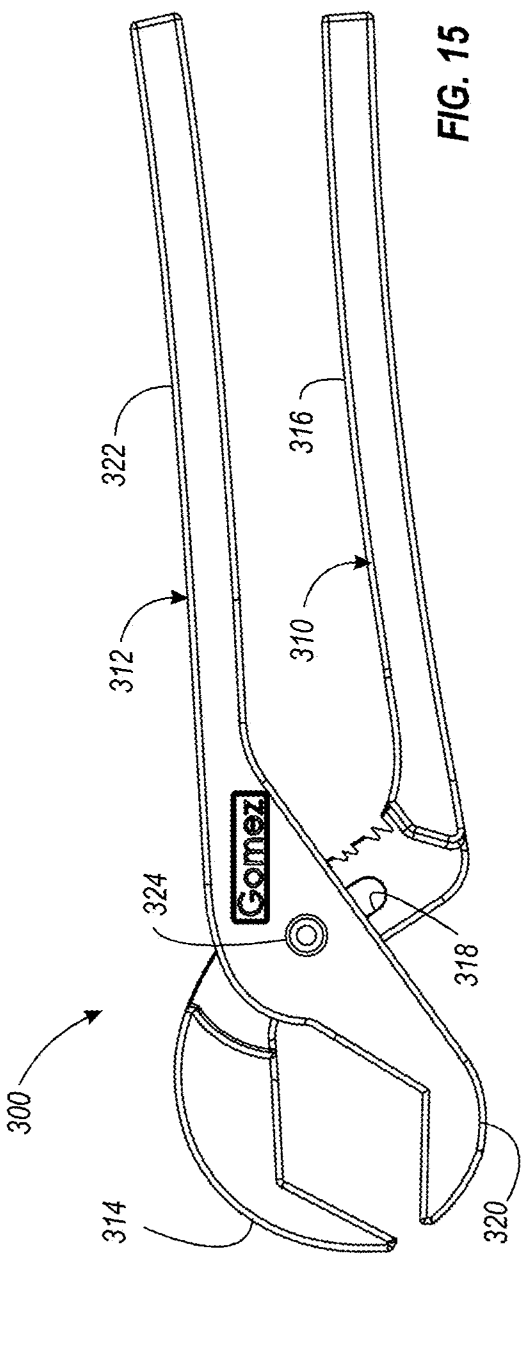
FIGS. 15-16 are opposite side views of the flush valve installation tool shown in FIG. 14.
Figure 18:
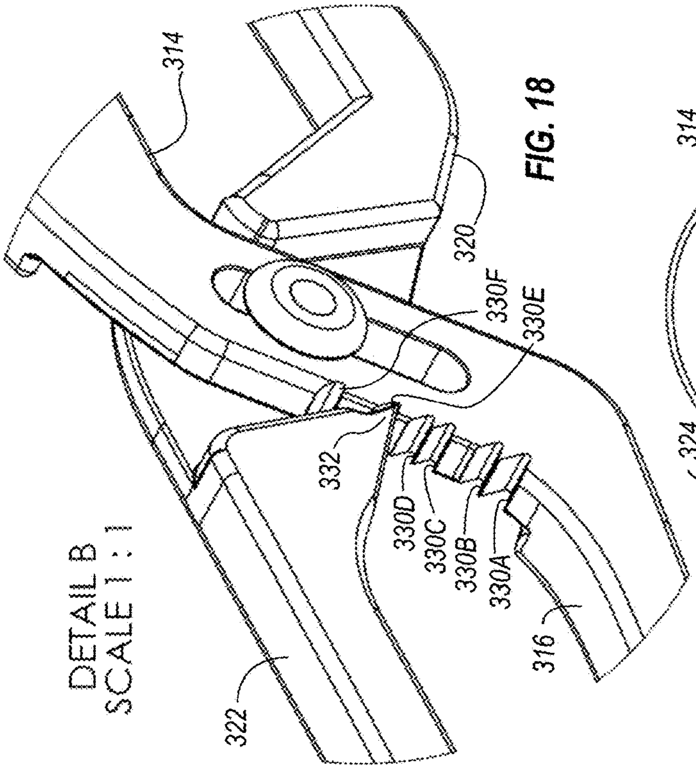
FIG. 18 is an enlarged partial view flush valve installation tool shown in FIG. 14 taken along line B.
Figure 17:
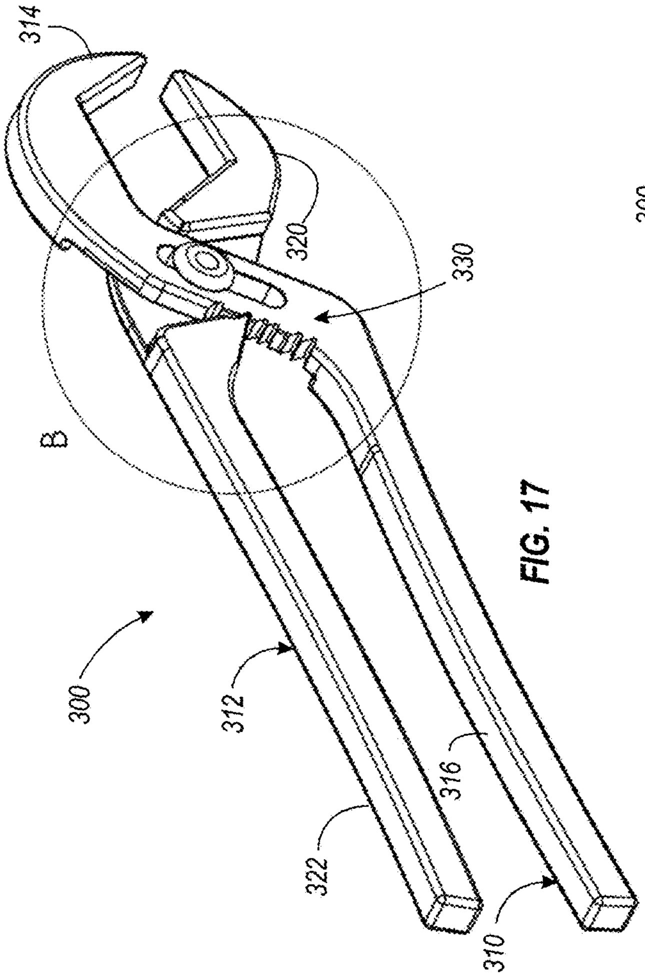
FIG. 17 is a second isometric view of the flush valve installation tool shown in FIG. 14.
Figure 16:
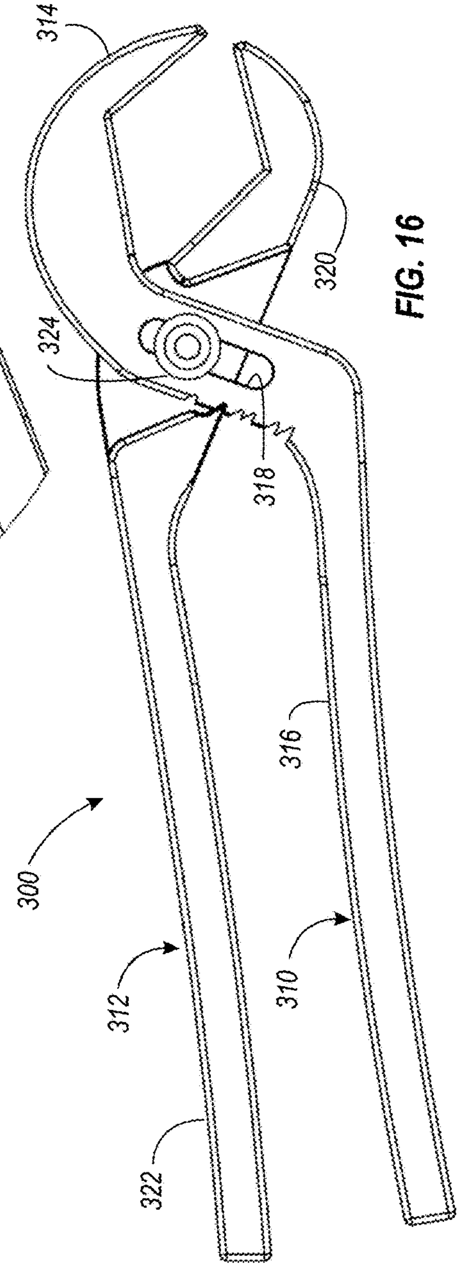

FIG. 14 is an isometric view of a flush valve installation tool 300. FIG. 17 is an isometric view of the flush valve installation tool 300 shown in FIG. 14 from the opposite side. FIG. is a side view of the flush valve installation tool 300 shown in FIG. 13. FIG. 16 is a side view of the flush valve installation tool 300 shown in FIG. 15 from the opposite side. FIG. 8 is an enlarged partial view of the flush valve installation tool 300 shown in FIG. 17 taken along line B, showing more details of the locking mechanism of the flush valve installation tool 300.

The flush valve installation tool 300 has opposing first and second members 310 and 312 coupled together by a pin/bolt 324. The first member 310 has a first handle 316 and a jaw 314 formed at the opposite end. The second member 312 has a first handle 322 and a jaw 320 formed at the opposite end. A slot 318 is formed in the first member 310 and is configured to slide with respect to second member 312 to adjust the distance between opposing jaw faces to accommodate different sized nuts.

The second member 312 has a protrusion/point 332 (FIG. 18) configured to engage one of several slots 330 (FIG. 17) formed in the first member 310 to lock the tool 300 in a desired position, depending the size of the nut being tightened or loosened. Enlarged view 18 shows an example where the first member 310 has 6 slots 330A, 330B, 330C, 330D, 330E, and 330F. A user can slide the bolt 324 along the slot 318 to choose which slot 330 the point 332 engages. Depending on which slot 330 is chosen, the spacing between the jaws 314 and 320 is best accommodate certain sized nuts or bolts. In the example shown, slot 330A results in the largest spacing (for relatively large nuts) and slot 330 results in the smallest spacing (for relatively small nuts). The locations of the slots 330 can be configured to accommodate specific sized nuts. For example, in the context of the tool's use as a flush valve installation tool, the slots 330 can be positioned to accommodate the standard sized flush valve nuts, such that a single tool is optimized for each of the flush valve nuts. In the example shown in FIG. 18, protrusion 332 is engaging slot 330E to accommodate a corresponding sized nut.

The jaw faces, handles, etc., of the flush valve installation tool 300 function in the same way as they do with the flush valve installation tool 200 described in detail above, so they will not be described again.

Figure 19:
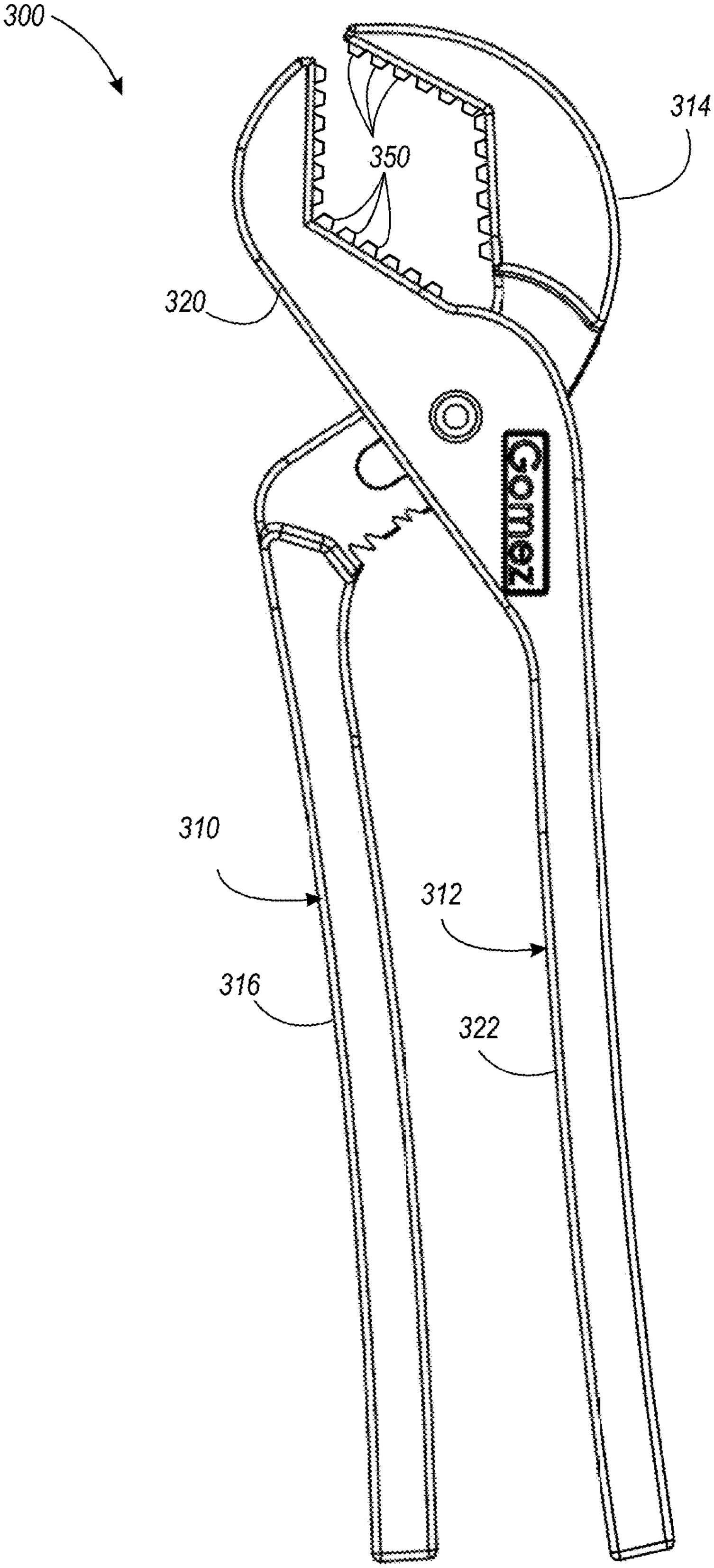
FIG. 19 is a side view of an alternative flush valve installation tool.
Figure 20:
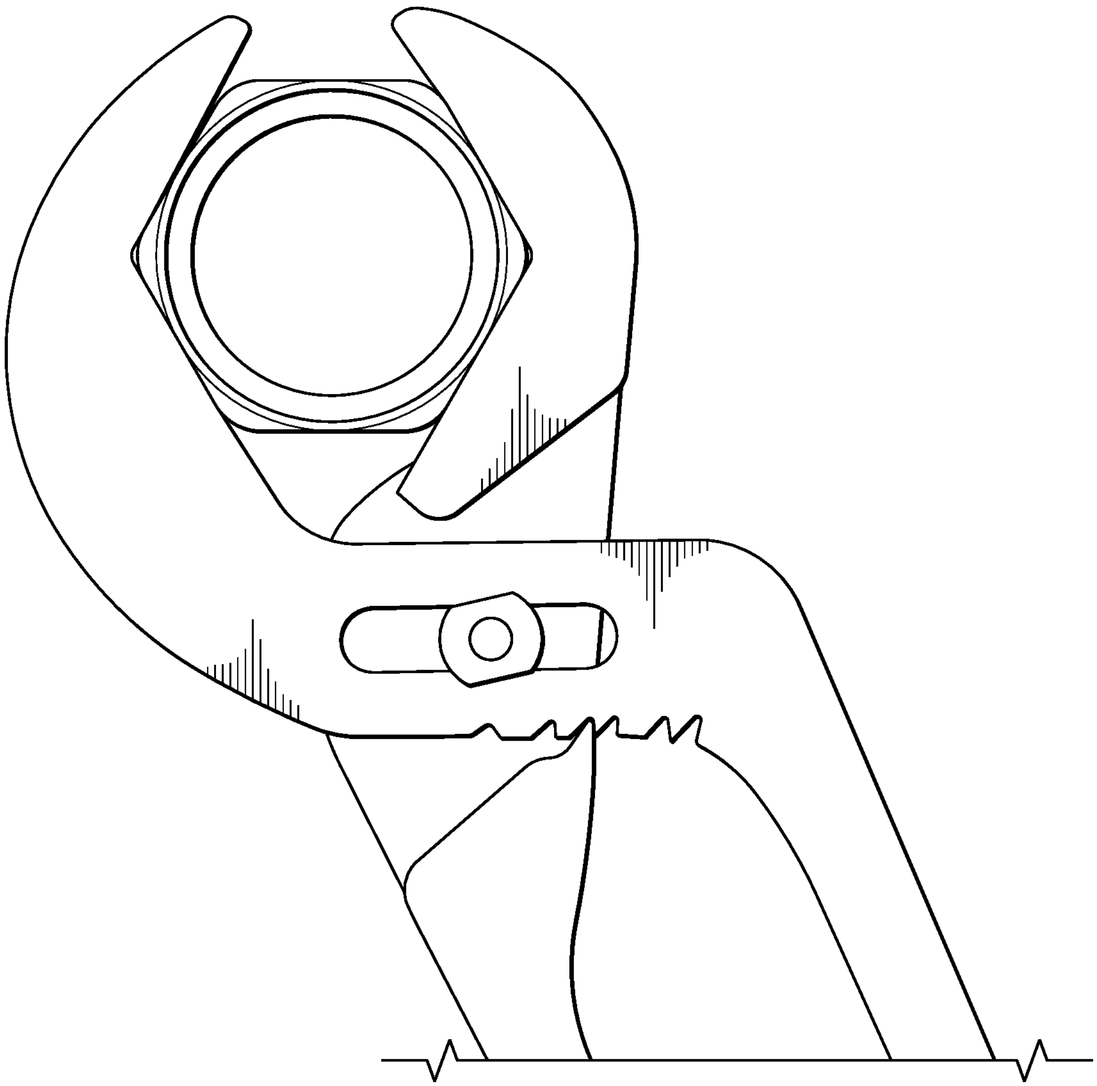
FIGS. 20-25 are views of the flush valve installation tool shown in FIG. 14 being used with various sized nuts.
Figure 21:
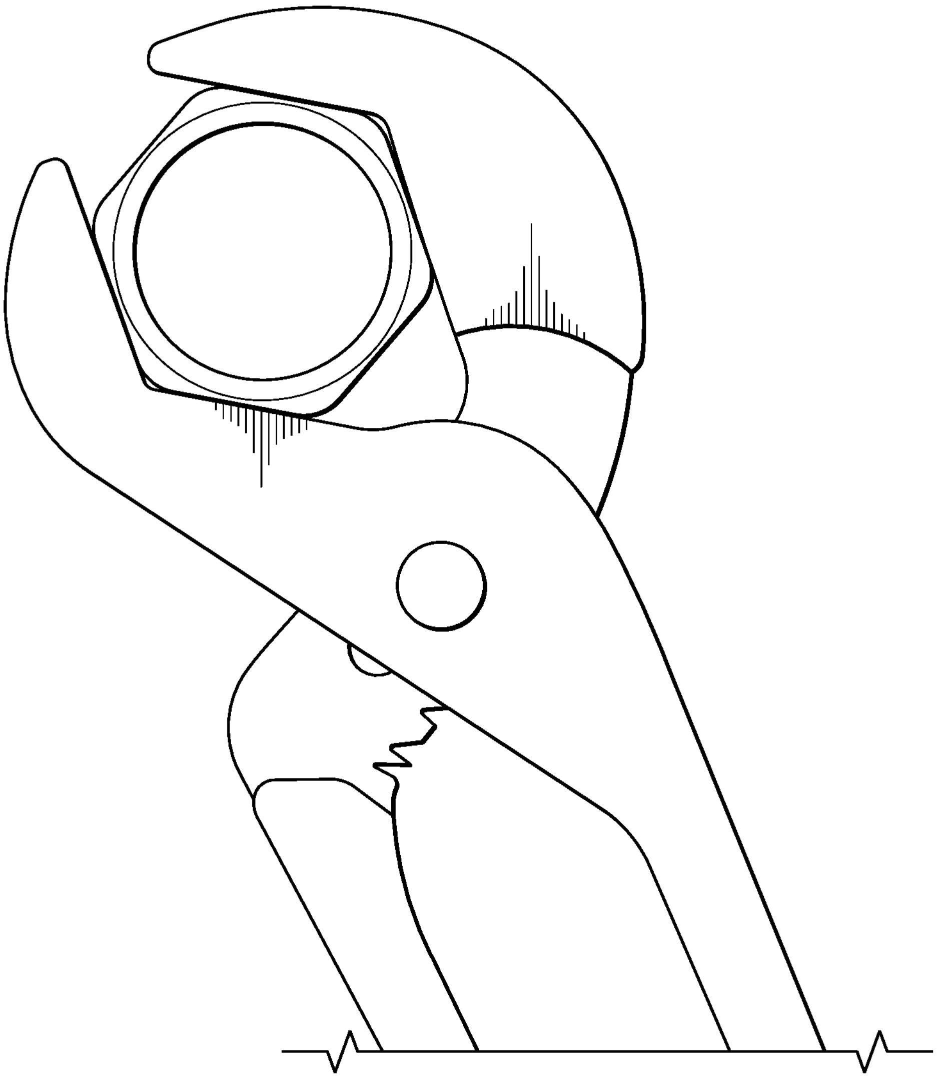
Figure 22:
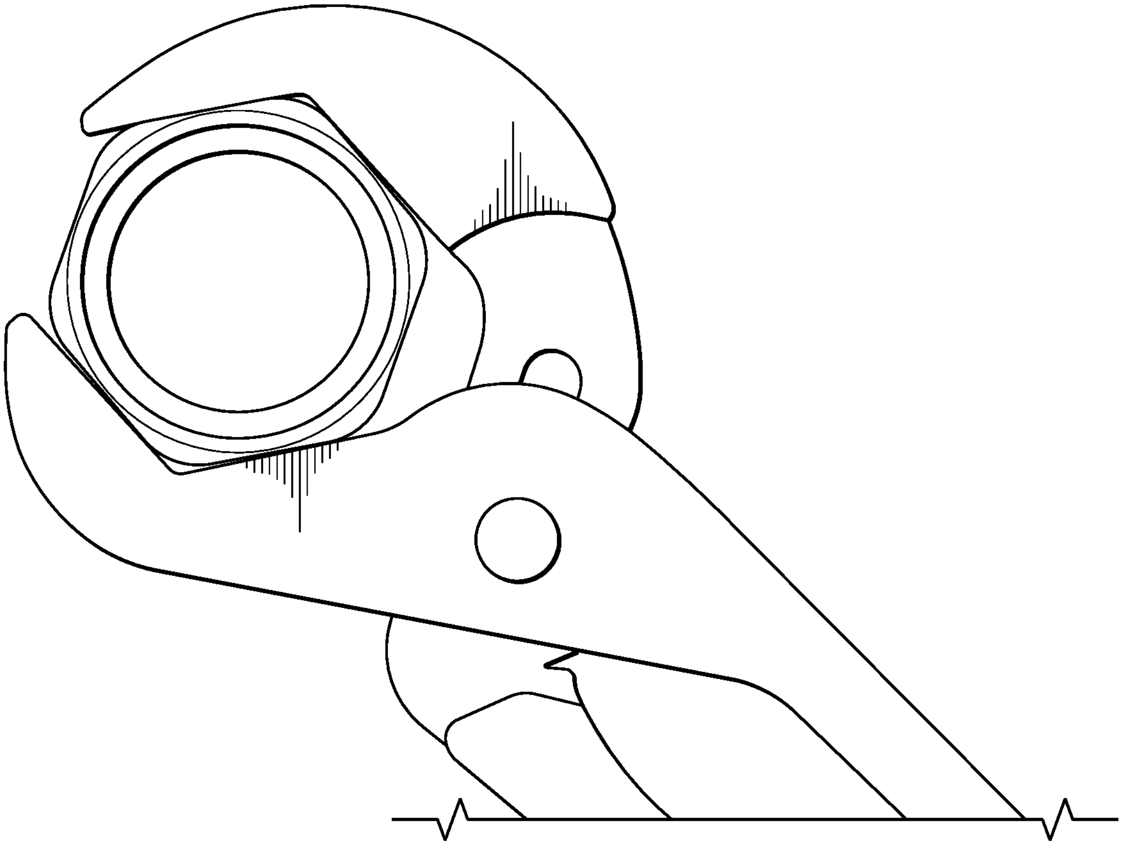
Figure 23:
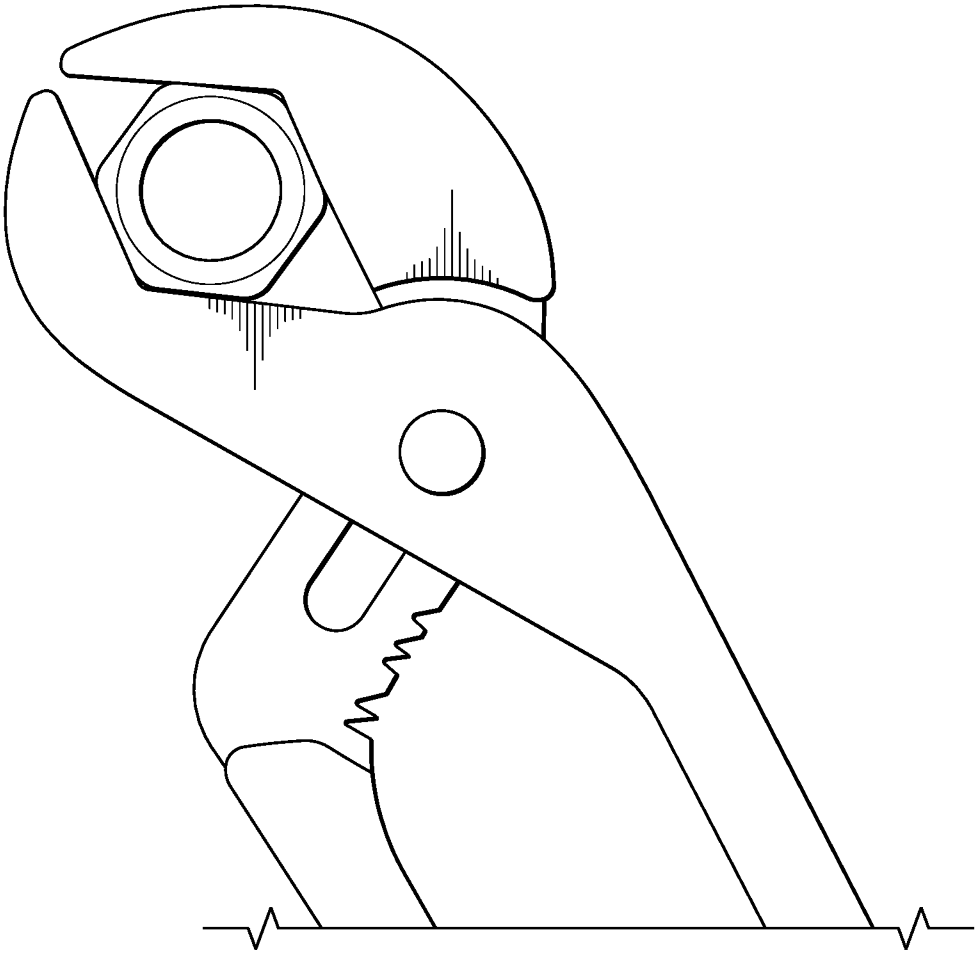
Figure 24:
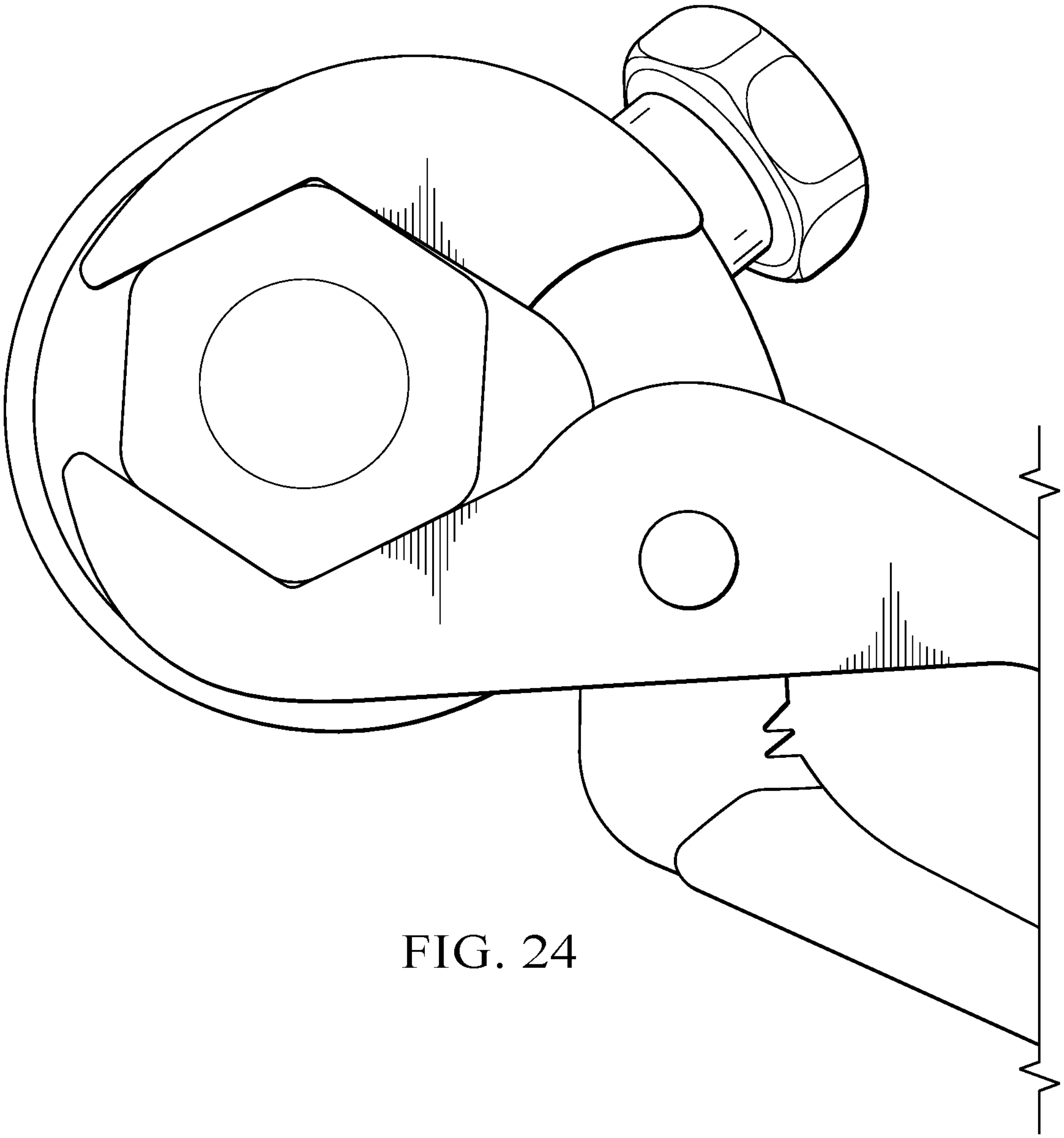
Figure 25:
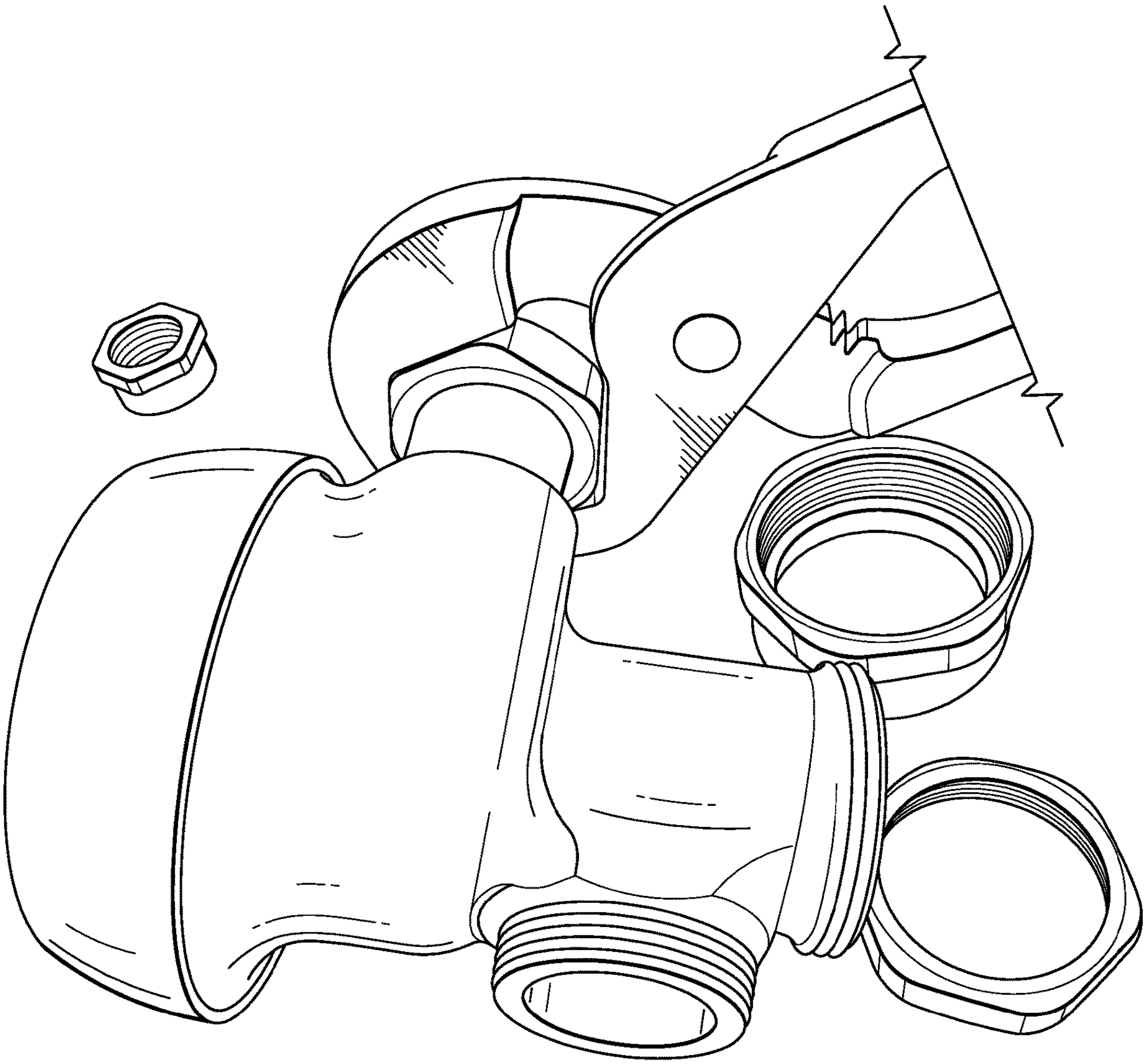

While the examples above show flush valve installation tools with smooth jaw faces, other examples are possible. For example, as before with respect to FIG. 13, one or more of the jaw faces may include teeth or other types of surfaces for reducing slippage when damage to chrome parts is less of a concern. FIG. 19 is a side view of a flush valve installation tool 300 similar to the tools described above. In this example, each jaw face has a plurality of teeth 350 for reducing slippage. The shape, position, dimensions, and configuration, etc., of the teeth can vary, as desired.

Like with the flush valve installation tool 200, the flush valve installation tool 300 can be used with various sized nuts (for example, nuts 103, 106, 117, 119, 122, shown in FIG. 1). The valve installation tool 300 operates in the same manner as the tool 200 shown in FIGS. 6, 7, and 8, just with the locking mechanism described above.

Similar to FIGS. 6A, 7A, and 8A described above, FIGS. 20-25 show a flush valve installation tool 300 being used with different sized nuts. In the examples shown, the nuts are various nuts involved in the installation of a flush valve.

In the preceding detailed description, the disclosure is described with reference to specific exemplary embodiments thereof. Various modifications and changes may be made thereto without departing from the broader spirit and scope of the disclosure as set forth in the claims. The specification and drawings are, accordingly, to be regarded in an illustrative rather than a restrictive sense.

What is claimed is:

1. A flush valve installation tool comprising;

a first member;

a first, second, and third jaw faces formed proximate one end of the first member, the first and second jaw faces forming a 120 degree angle, the second and third jaw faces forming a 120 degree angle such that the first, second, and third jaw faces form three sides of a hexagon;

a second member slidably and rotatably coupled to the first member;

fourth and fifth jaw faces formed proximate one end of the second member, the fourth and fifth jaw faces forming a 120 degree angle;

a protrusion formed on one of the first and second members and a plurality of corresponding mating slots formed on the opposing first or second member, the mating slots being irregularly spaced from one another at locations along the opposing first or second member to accommodate specific sized nuts when the protrusion is seated in a given slot; and wherein at least four of the jaw faces conform to the shape of a hexagonal-shaped nut when the first and second members are squeezed together by a user with the jaw faces engaging the hexagonal nut.

2. The flush valve installation tool of claim 1, wherein five of the jaw faces conform to the shape of the hexagonal-shaped nut when the first and second members are squeezed together by the user with the jaw faces engaging the hexagonal nut.

3. The flush valve installation tool of claim 1, wherein the protrusion and corresponding mating slots are configured to hold the first, second, and third jaw faces at a desired distance from the fourth and fifth jaw faces when the protrusion is placed within one of the plurality of corresponding slots.

4. The flush valve installation tool of claim 1, wherein the first and second members are rotatably coupled together by a bolt.

5. The flush valve installation tool of claim 4, wherein the bolt is coupled to one of the first or second members.

6. The flush valve installation tool of claim 5, further comprising a slot formed in one of the first or second members, wherein the bolt is configured to slide through the slot to allow a user to adjust the distance between opposing jaw faces.

7. The flush valve installation tool of claim 1, wherein the first, second, third, fourth, and fifth jaw faces each have a smooth surface.

8. The flush valve installation tool of claim 1, wherein the first, second, third, fourth, and fifth jaw faces each have a plurality of teeth.

9. A flush valve installation tool comprising;

a first member;

two or more jaw faces formed proximate one end of the first member, at least two or more of jaw faces of the first member forming a 120 degree angle;

a second member movably coupled to the first member;

two or more jaw faces formed proximate one end of the second member, at least two or more of jaw faces of the second member forming a 120 degree angle;

a protrusion formed on one of the first and second members and a plurality of corresponding mating slots formed on the opposing first or second member, the mating slots being irregularly spaced from one another at locations along the opposing first or second member to accommodate specific sized nuts when the protrusion is seated in a given slot; and wherein the first and second members are movable with respect to one another to allow a user to adjust the size of the flush valve installation tool to accommodate different sized nuts.

10. The flush valve installation tool of claim 9, wherein three jaw faces are formed in the first member.

11. The flush valve installation tool of claim 9, wherein the protrusion and corresponding mating slots are configured to hold the jaw faces of the first member at a desired distance from the jaw faces of the second member when the protrusion is placed within one of the plurality of corresponding slots.

12. The flush valve installation tool of claim 11, wherein the first and second members are rotatably coupled together by a bolt.

13. The flush valve installation tool of claim 12, wherein the bolt is coupled to one of the first or second members.

14. The flush valve installation tool of claim 13, further comprising a slot formed in one of the first or second members, wherein the bolt is configured to slide through the slot to allow a user to adjust the distance between opposing jaw faces.

15. The flush valve installation tool of claim 9, wherein the two or more jaw faces of the first member each have a smooth surface.

16. The flush valve installation tool of claim 9, wherein the two or more jaw faces of the first member each have a plurality of teeth.

17. A method of installing nuts on a chrome flush valve comprising:

providing a tool, the tool having first and second members slidably and rotatably coupled to each other, the first and second members each having a handle portion and an end portion;

forming first, second and third jaw faces in the end portion of the first member, the first and second jaw faces forming a 120 degree angle, the second and third jaw faces forming a 120 degree angle such that the first, second and third jaw faces form three sides of a hexagon;

forming fourth and fifth jaw faces in the end portion of the second member, the fourth and fifth jaw faces forming a 120 degree angle, wherein at least four of the jaw faces conform to the shape of a hexagonal-shaped nut when the first and second members are squeezed together by a user with the jaw faces engaging the hexagonal nut;

forming a protrusion on one of the first and second members and a plurality of corresponding mating slots formed on the opposing first or second member, the mating slots being irregularly spaced from one another at locations along the opposing first or second member to accommodate specific sized nuts when the protrusion is seated in a given slot;

threading a nut on the flush valve;

placing at least the first, second, fourth and fifth jaw faces around the nut;

squeezing the handles of the first and second members to tightly engage four surfaces of the nut with the first, second, fourth and fifth jaw faces; and applying torque to the tool to tighten the nut.

18. The method of claim 17, further comprising:

threading a second nut on the flush valve, the second nut being larger than the first nut;

adjusting the size of the tool by adjusting the point of rotation of the first and second members;

placing at least the first, second, fourth and fifth jaw faces around the second nut;

squeezing the handles of the first and second members to tightly engage four surfaces of the second nut with the first, second, fourth and fifth jaw faces; and applying torque to the tool to tighten the second nut.

19. The method of claim 18, wherein the size of the tool is adjusted by placing a protrusion formed in one of the first and second members into one of a plurality of slots formed in the other first or second member.

* * * * *